(12) United States Patent
Bridges

(10) Patent No.: US 10,578,423 B2
(45) Date of Patent: *Mar. 3, 2020

(54) DIAGNOSING MULTIPATH INTERFERENCE AND ELIMINATING MULTIPATH INTERFERENCE IN 3D SCANNERS USING PROJECTION PATTERNS

(71) Applicant: FARO Technologies, Inc., Lake Mary, FL (US)

(72) Inventor: Robert E. Bridges, Kennett Square, PA (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 330 days.

This patent is subject to a terminal disclaimer.

(21) Appl. No.: 15/252,278

(22) Filed: Aug. 31, 2016

(65) Prior Publication Data

US 2016/0370171 A1 Dec. 22, 2016

Related U.S. Application Data

(63) Continuation of application No. 14/139,021, filed on Dec. 23, 2013, now Pat. No. 9,453,717, which is a
(Continued)

(51) Int. Cl.
*G01B 11/00* (2006.01)
*H04N 13/204* (2018.01)
(Continued)

(52) U.S. Cl.
CPC ............ *G01B 11/002* (2013.01); *G01B 5/004* (2013.01); *G01B 11/2513* (2013.01);
(Continued)

(58) Field of Classification Search
CPC ............... G01B 11/002; G06T 7/593
(Continued)

(56) References Cited

U.S. PATENT DOCUMENTS 2,612,994 A 10/1952 Woodland
2,682,804 A 7/1954 Clifford et al.
(Continued)

FOREIGN PATENT DOCUMENTS

AT 501507 A1 9/2006
AT 506110 A1 6/2009
(Continued)

OTHER PUBLICATIONS

Japanese Office Action for Application No. 2016-500623 dated Oct. 3, 2017; 4 pgs.
(Continued)

*Primary Examiner* — Joseph G Ustaris
*Assistant Examiner* — Amir Shahnami
(74) *Attorney, Agent, or Firm* — Cantor Colburn LLP

(57) ABSTRACT

A noncontact optical three-dimensional measuring device that includes a projector and a camera; a processor electrically coupled to the projector and the camera; and computer readable media which, when executed by the processor, causes the first signal to be collected at a first time and the second signal to be collected at a second time different than the first time and determines three-dimensional coordinates of a first point on the surface based at least in part on the first signal and the distance and determines three-dimensional coordinates of a second point on the surface based at least in part on the second signal and the distance.

18 Claims, 14 Drawing Sheets

Related U.S. Application Data continuation of application No. 13/443,946, filed on Apr. 11, 2012, now Pat. No. 9,151,830.

(60) Provisional application No. 61/791,797, filed on Mar. 15, 2013, provisional application No. 61/592,049, filed on Jan. 30, 2012, provisional application No. 61/475,703, filed on Apr. 15, 2011.

(51) Int. Cl.

| | | |
|---|---|---|
| H04N 13/254 | (2018.01) | |
| H04N 13/275 | (2018.01) | |
| G06T 7/70 | (2017.01) | |
| G06T 7/593 | (2017.01) | |
| G01B 21/04 | (2006.01) | |
| G01B 11/25 | (2006.01) | |
| G01S 17/66 | (2006.01) | |
| G01B 5/004 | (2006.01) | |
| G01S 17/00 | (2020.01) | |
| G01S 17/48 | (2006.01) | |
| H04N 13/239 | (2018.01) | |
| G01C 3/10 | (2006.01) | |

(52) U.S. Cl.
CPC ........ *G01B 11/2531* (2013.01); *G01B 21/045* (2013.01); *G01C 3/10* (2013.01); *G01S 17/003* (2013.01); *G01S 17/48* (2013.01); *G01S 17/66* (2013.01); *G06T 7/593* (2017.01); *G06T 7/70* (2017.01); *H04N 13/204* (2018.05); *H04N 13/239* (2018.05); *H04N 13/254* (2018.05); *H04N 13/275* (2018.05); *G06T 2200/04* (2013.01); *G06T 2207/10028* (2013.01)

(58) Field of Classification Search
USPC .......................................................... 348/46
See application file for complete search history.

(56) References Cited

U.S. PATENT DOCUMENTS

| | | | |
|---|---|---|---|
| 2,784,641 | A | 3/1957 | Keuffel et al. |
| 2,484,641 | A | 3/1959 | Keuffel et al. |
| 3,339,457 | A | 9/1967 | Pun |
| 3,365,717 | A | 1/1968 | Holscher |
| 3,464,770 | A | 9/1969 | Schmidt |
| 3,497,695 | A | 2/1970 | Smith et al. |
| 3,508,828 | A | 4/1970 | Froome et al. |
| 3,619,058 | A | 11/1971 | Hewlett et al. |
| 3,627,429 | A | 12/1971 | Jaenicke et al. |
| 3,658,426 | A | 4/1972 | Vyce |
| 3,728,025 | A | 4/1973 | Madigan et al. |
| 3,740,141 | A | 6/1973 | DeWitt, Jr. |
| 3,779,645 | A | 12/1973 | Nakazawa et al. |
| 3,813,165 | A | 5/1974 | Hines et al. |
| 3,832,056 | A | 8/1974 | Shipp et al. |
| 3,900,260 | A | 8/1975 | Wendt |
| 3,914,052 | A | 10/1975 | Wiklund |
| 4,113,381 | A | 9/1978 | Epstein |
| 4,178,515 | A | 12/1979 | Tarasevich |
| 4,297,030 | A | 10/1981 | Chaborski |
| 4,403,857 | A | 9/1983 | Holscher |
| 4,413,907 | A | 11/1983 | Lane |
| 4,453,825 | A | 6/1984 | Buck et al. |
| 4,498,764 | A | 2/1985 | Bolkow et al. |
| 4,521,107 | A | 6/1985 | Chaborski et al. |
| 4,531,833 | A | 7/1985 | Ohtomo |
| 4,537,475 | A | 8/1985 | Summers et al. |
| 4,560,270 | A | 12/1985 | Wiklund et al. |
| 4,632,547 | A | 12/1986 | Kaplan et al. |
| 4,652,130 | A | 3/1987 | Tank |
| 4,689,489 | A | 8/1987 | Cole |
| 4,692,023 | A | 9/1987 | Ohtomo et al. |
| 4,699,508 | A | 10/1987 | Bolkow et al. |
| 4,707,129 | A | 11/1987 | Hashimoto et al. |
| 4,714,339 | A | 12/1987 | Lau et al. |
| 4,731,812 | A | 3/1988 | Akerberg |
| 4,731,879 | A | 3/1988 | Sepp et al. |
| 4,767,257 | A | 8/1988 | Kato |
| 4,777,660 | A | 10/1988 | Gould et al. |
| 4,790,651 | A | 12/1988 | Brown et al. |
| 4,839,507 | A | 6/1989 | May |
| 4,983,021 | A | 1/1991 | Fergason |
| 5,002,388 | A | 3/1991 | Ohishi et al. |
| 5,051,934 | A | 9/1991 | Wiklund |
| 5,069,524 | A | 12/1991 | Watanabe et al. |
| 5,082,364 | A | 1/1992 | Russell |
| 5,090,131 | A | 2/1992 | Deer |
| 5,121,242 | A | 6/1992 | Kennedy |
| 5,137,354 | A | 8/1992 | Devos et al. |
| 5,138,154 | A | 8/1992 | Hotelling |
| 5,162,862 | A | 11/1992 | Bartram et al. |
| 5,175,601 | A | 12/1992 | Fitts |
| 5,198,868 | A | 3/1993 | Saito et al. |
| 5,237,384 | A | 8/1993 | Fukunaga et al. |
| 5,263,103 | A | 11/1993 | Kosinski |
| 5,267,014 | A | 11/1993 | Prenninger |
| 5,301,005 | A | 4/1994 | Devos et al. |
| 5,313,409 | A | 5/1994 | Wiklund et al. |
| 5,319,434 | A | 6/1994 | Croteau et al. |
| 5,347,306 | A | 9/1994 | Nitta |
| 5,392,521 | A | 2/1995 | Allen |
| 5,400,130 | A | 3/1995 | Tsujimoto et al. |
| 5,402,193 | A | 3/1995 | Choate |
| 5,402,582 | A | 4/1995 | Raab |
| 5,416,321 | A | 5/1995 | Sebastian et al. |
| 5,440,112 | A | 8/1995 | Sakimura et al. |
| 5,440,326 | A | 8/1995 | Quinn |
| 5,448,505 | A | 9/1995 | Novak |
| 5,455,670 | A | 10/1995 | Payne et al. |
| 5,500,737 | A | 3/1996 | Donaldson et al. |
| 5,532,816 | A | 7/1996 | Spann et al. |
| 5,534,992 | A | 7/1996 | Takeshima et al. |
| 5,594,169 | A | 1/1997 | Field et al. |
| 5,611,147 | A | 3/1997 | Raab |
| D378,751 | S | 4/1997 | Smith |
| 5,671,160 | A | 9/1997 | Julian |
| 5,698,784 | A | 12/1997 | Hotelling et al. |
| 5,724,264 | A | 3/1998 | Rosenberg et al. |
| 5,737,068 | A | 4/1998 | Kaneko et al. |
| 5,742,379 | A | 4/1998 | Reifer |
| 5,754,284 | A | 5/1998 | Leblanc et al. |
| 5,764,360 | A | 6/1998 | Meier |
| 5,767,952 | A | 6/1998 | Ohtomo et al. |
| 5,771,623 | A | 6/1998 | Pernstich et al. |
| 5,817,243 | A | 10/1998 | Shaffer |
| 5,825,350 | A | 10/1998 | Case, Jr. et al. |
| 5,828,057 | A | 10/1998 | Hertzman et al. |
| 5,861,956 | A | 1/1999 | Bridges et al. |
| 5,880,822 | A | 3/1999 | Kubo |
| 5,886,775 | A | 3/1999 | Houser et al. |
| 5,886,777 | A | 3/1999 | Hirunuma |
| 5,892,575 | A | 4/1999 | Marino |
| 5,893,214 | A | 4/1999 | Meier et al. |
| 5,898,421 | A | 4/1999 | Quinn |
| 5,926,388 | A | 7/1999 | Kimbrough et al. |
| 5,930,030 | A | 7/1999 | Scifres |
| 5,957,559 | A | 9/1999 | Rueb et al. |
| 5,973,788 | A | 10/1999 | Pettersen et al. |
| 5,991,011 | A | 11/1999 | Damm |
| 6,017,125 | A | 1/2000 | Vann |
| 6,023,326 | A | 2/2000 | Katayama et al. |
| 6,034,722 | A | 3/2000 | Viney et al. |
| 6,036,319 | A | 3/2000 | Rueb et al. |
| 6,052,190 | A | 4/2000 | Sekowski et al. |
| D427,087 | S | 6/2000 | Kaneko et al. |
| 6,085,155 | A | 7/2000 | Hayase et al. |
| 6,097,491 | A | 8/2000 | Hartrumpf |
| 6,097,897 | A | 8/2000 | Ide |
| 6,100,540 | A | 8/2000 | Ducharme et al. |
| 6,111,563 | A | 8/2000 | Hines |
| 6,122,058 | A | 9/2000 | Van Der Werf et al. |

(56) References Cited

U.S. PATENT DOCUMENTS

| | | |
|---|---|---|
| 6,133,998 A | 10/2000 | Monz et al. |
| 6,166,809 A | 12/2000 | Pettersen et al. |
| 6,171,018 B1 | 1/2001 | Ohtomo et al. |
| 6,193,371 B1 | 2/2001 | Snook |
| 6,222,465 B1 | 4/2001 | Kumar et al. |
| 6,262,801 B1 | 7/2001 | Shibuya et al. |
| 6,295,174 B1 | 9/2001 | Ishinabe et al. |
| 6,317,954 B1 | 11/2001 | Cunningham et al. |
| 6,324,024 B1 | 11/2001 | Shirai et al. |
| 6,330,379 B1 | 12/2001 | Hendriksen |
| 6,344,846 B1 | 2/2002 | Hines |
| 6,347,290 B1 | 2/2002 | Bartlett |
| 6,351,483 B1 | 2/2002 | Chen |
| 6,353,764 B1 | 3/2002 | Imagawa et al. |
| 6,369,794 B1 | 4/2002 | Sakurai et al. |
| 6,369,880 B1 | 4/2002 | Steinlechner |
| 6,433,866 B1 | 8/2002 | Nichols |
| 6,437,859 B1 | 8/2002 | Ohtomo et al. |
| 6,445,446 B1 | 9/2002 | Kumagai et al. |
| 6,462,810 B1 | 10/2002 | Muraoka et al. |
| 6,463,393 B1 | 10/2002 | Giger |
| 6,490,027 B1 | 12/2002 | Rajchel et al. |
| 6,501,543 B2 | 12/2002 | Hedges et al. |
| 6,532,060 B1 | 3/2003 | Kindaichi et al. |
| 6,559,931 B2 | 5/2003 | Kawamura et al. |
| 6,563,569 B2 | 5/2003 | Osawa et al. |
| 6,567,101 B1 | 5/2003 | Thomas |
| 6,573,883 B1 | 6/2003 | Bartlett |
| 6,573,981 B2 | 6/2003 | Kumagai et al. |
| 6,583,862 B1 | 6/2003 | Perger |
| 6,587,244 B1 | 7/2003 | Ishinabe et al. |
| 6,611,617 B1 | 8/2003 | Crampton |
| 6,624,916 B1 | 9/2003 | Green et al. |
| 6,630,993 B1 | 10/2003 | Hedges et al. |
| 6,633,367 B2 | 10/2003 | Gogolla |
| 6,646,732 B2 | 11/2003 | Ohtomo et al. |
| 6,650,222 B2 | 11/2003 | Darr |
| 6,667,798 B1 | 12/2003 | Markendorf et al. |
| 6,668,466 B1 | 12/2003 | Bieg et al. |
| 6,678,059 B2 | 1/2004 | Cho et al. |
| 6,681,031 B2 | 1/2004 | Cohen et al. |
| 6,727,984 B2 | 4/2004 | Becht |
| 6,727,985 B2 | 4/2004 | Giger |
| 6,754,370 B1 | 6/2004 | Hall-Holt et al. |
| 6,765,653 B2 | 7/2004 | Shirai et al. |
| 6,802,133 B2 | 10/2004 | Jordil et al. |
| 6,847,436 B2 | 1/2005 | Bridges |
| 6,859,744 B2 | 2/2005 | Giger |
| 6,864,966 B2 | 3/2005 | Giger |
| 6,935,036 B2 | 8/2005 | Raab |
| 6,957,493 B2 | 10/2005 | Kumagai et al. |
| 6,964,113 B2 | 11/2005 | Bridges et al. |
| 6,965,843 B2 | 11/2005 | Raab et al. |
| 6,980,881 B2 | 12/2005 | Greenwood et al. |
| 6,996,912 B2 | 2/2006 | Raab |
| 6,996,914 B1 | 2/2006 | Istre et al. |
| 7,022,971 B2 | 4/2006 | Ura et al. |
| 7,023,531 B2 | 4/2006 | Gogolla et al. |
| 7,055,253 B2 | 6/2006 | Kaneko |
| 7,072,032 B2 | 7/2006 | Kumagai et al. |
| 7,086,169 B1 | 8/2006 | Bayham et al. |
| 7,095,490 B2 | 8/2006 | Ohtomo et al. |
| 7,099,000 B2 | 8/2006 | Connolly |
| 7,129,927 B2 | 10/2006 | Mattsson |
| 7,130,035 B2 | 10/2006 | Ohtomo et al. |
| 7,168,174 B2 | 1/2007 | Piekutowski |
| 7,177,014 B2 | 2/2007 | Mori et al. |
| 7,193,695 B2 | 3/2007 | Sugiura |
| 7,196,776 B2 | 3/2007 | Ohtomo et al. |
| 7,222,021 B2 | 5/2007 | Ootomo et al. |
| 7,224,444 B2 | 5/2007 | Stierle et al. |
| 7,230,689 B2 | 6/2007 | Lau |
| 7,233,316 B2 | 6/2007 | Smith et al. |
| 7,246,030 B2 | 7/2007 | Raab et al. |
| 7,248,374 B2 | 7/2007 | Bridges |
| 7,253,891 B2 | 8/2007 | Toker et al. |
| 7,256,899 B1 | 8/2007 | Faul et al. |
| 7,262,863 B2 | 8/2007 | Schmidt et al. |
| 7,274,802 B2 | 9/2007 | Kumagai et al. |
| 7,285,793 B2 | 10/2007 | Husted |
| 7,286,246 B2 | 10/2007 | Yoshida |
| 7,304,729 B2 | 12/2007 | Yasutomi et al. |
| 7,307,710 B2 | 12/2007 | Gatsios et al. |
| 7,312,862 B2 | 12/2007 | Zumbrunn et al. |
| 7,321,420 B2 | 1/2008 | Yasutomi et al. |
| 7,325,326 B1 | 2/2008 | Istre et al. |
| 7,327,446 B2 | 2/2008 | Cramer et al. |
| 7,336,346 B2 | 2/2008 | Aoki et al. |
| 7,336,375 B1 | 2/2008 | Faul et al. |
| 7,339,655 B2 | 3/2008 | Nakamura et al. |
| 7,345,748 B2 | 3/2008 | Sugiura et al. |
| 7,352,446 B2 | 4/2008 | Bridges et al. |
| 7,353,954 B1 | 4/2008 | Malek et al. |
| 7,372,558 B2 | 5/2008 | Kaufman et al. |
| 7,388,654 B2 | 6/2008 | Raab et al. |
| 7,388,658 B2 | 6/2008 | Glimm |
| 7,401,783 B2 | 7/2008 | Pryor |
| 7,423,742 B2 | 9/2008 | Gatsios et al. |
| 7,429,112 B2 | 9/2008 | Metcalfe |
| 7,446,863 B2 | 11/2008 | Nishita et al. |
| 7,453,554 B2 | 11/2008 | Yang et al. |
| 7,466,401 B2 | 12/2008 | Cramer et al. |
| 7,471,377 B2 | 12/2008 | Liu et al. |
| 7,474,388 B2 | 1/2009 | Ohtomo et al. |
| 7,480,037 B2 | 1/2009 | Palmateer et al. |
| 7,492,444 B2 | 2/2009 | Osada |
| 7,503,123 B2 | 3/2009 | Matsuo et al. |
| 7,511,824 B2 | 3/2009 | Sebastian et al. |
| 7,518,709 B2 | 4/2009 | Oishi et al. |
| 7,535,555 B2 | 5/2009 | Nishizawa et al. |
| 7,541,965 B2 | 6/2009 | Ouchi et al. |
| 7,552,539 B2 | 6/2009 | Piekutowski |
| 7,555,766 B2 | 6/2009 | Kondo et al. |
| 7,562,459 B2 | 7/2009 | Fourquin et al. |
| 7,564,538 B2 | 7/2009 | Sakimura et al. |
| 7,565,216 B2 | 7/2009 | Soucy |
| 7,583,375 B2 | 9/2009 | Cramer et al. |
| 7,586,586 B2 | 9/2009 | Constantikes |
| 7,613,501 B2 | 11/2009 | Scherch |
| 7,614,019 B2 | 11/2009 | Rimas Ribikauskas et al. |
| D605,959 S | 12/2009 | Apotheloz |
| 7,634,374 B2 | 12/2009 | Chouinard et al. |
| 7,634,381 B2 | 12/2009 | Westermark et al. |
| 7,692,628 B2 | 4/2010 | Smith et al. |
| 7,701,559 B2 | 4/2010 | Bridges et al. |
| 7,701,566 B2 | 4/2010 | Kumagai et al. |
| 7,705,830 B2 | 4/2010 | Westerman et al. |
| 7,710,396 B2 | 5/2010 | Smith et al. |
| 7,724,380 B2 | 5/2010 | Horita et al. |
| 7,728,963 B2 | 6/2010 | Kirschner |
| 7,738,083 B2 | 6/2010 | Luo et al. |
| 7,751,654 B2 | 7/2010 | Lipson et al. |
| 7,761,814 B2 | 7/2010 | Rimas-Ribikauskas et al. |
| 7,765,084 B2 | 7/2010 | Westermark et al. |
| 7,782,298 B2 | 8/2010 | Smith et al. |
| 7,800,758 B1 | 9/2010 | Bridges et al. |
| 7,804,051 B2 | 9/2010 | Hingerling et al. |
| 7,804,602 B2 | 9/2010 | Raab |
| 7,812,736 B2 | 10/2010 | Collingwood et al. |
| 7,812,969 B2 | 10/2010 | Morimoto et al. |
| D629,314 S | 12/2010 | Ogasawara |
| 7,876,457 B2 | 1/2011 | Rueb |
| 7,894,079 B1 | 2/2011 | Altendorf et al. |
| 7,903,237 B1 | 3/2011 | Li |
| 7,929,150 B1 | 4/2011 | Schweiger |
| 7,954,250 B2 | 6/2011 | Crampton |
| 7,976,387 B2 | 7/2011 | Venkatesh et al. |
| 7,983,872 B2 | 7/2011 | Makino et al. |
| 7,990,523 B2 | 8/2011 | Schlierbach et al. |
| 7,990,550 B2 | 8/2011 | Aebischer et al. |
| 8,087,315 B2 | 1/2012 | Goossen et al. |
| 8,094,121 B2 | 1/2012 | Obermeyer et al. |
| 8,094,212 B2 | 1/2012 | Jelinek |
| 8,125,629 B2 | 2/2012 | Dold et al. |

(56) References Cited

U.S. PATENT DOCUMENTS

| | | | |
|---|---|---|---|
| 8,151,477 B2 | 4/2012 | Tait | |
| 8,190,030 B2 | 5/2012 | Leclair et al. | |
| 8,217,893 B2 | 7/2012 | Quinn et al. | |
| 8,237,934 B1 | 8/2012 | Cooke et al. | |
| 8,244,023 B2 | 8/2012 | Yamada | |
| 8,279,430 B2 | 10/2012 | Dold et al. | |
| 8,314,939 B2 | 11/2012 | Kato | |
| 8,320,708 B2 | 11/2012 | Kurzweil et al. | |
| 8,360,240 B2 | 1/2013 | Kallabis | |
| 8,379,224 B1 | 2/2013 | Piasse et al. | |
| 8,384,760 B2 | 2/2013 | Tan | |
| 8,387,961 B2 | 3/2013 | Im | |
| 8,405,604 B2 | 3/2013 | Pryor et al. | |
| 8,422,034 B2 | 4/2013 | Steffensen et al. | |
| 8,437,011 B2 | 5/2013 | Steffensen et al. | |
| 8,438,747 B2 | 5/2013 | Ferrari | |
| 8,467,071 B2 | 6/2013 | Steffey et al. | |
| 8,467,072 B2 | 6/2013 | Cramer et al. | |
| 8,483,512 B2 | 7/2013 | Moeller | |
| 8,485,668 B2 | 7/2013 | Zhang | |
| 8,509,949 B2 | 8/2013 | Bordyn et al. | |
| 8,525,983 B2 | 9/2013 | Bridges et al. | |
| 8,537,371 B2 | 9/2013 | Steffensen et al. | |
| 8,537,375 B2 | 9/2013 | Steffensen et al. | |
| 8,553,212 B2 | 10/2013 | Jaeger et al. | |
| 8,593,648 B2 | 11/2013 | Cramer et al. | |
| 8,619,265 B2 | 12/2013 | Steffey et al. | |
| 8,630,314 B2 | 1/2014 | York | |
| 8,638,984 B2 | 1/2014 | Roithmeier | |
| 8,654,354 B2 | 2/2014 | Steffensen et al. | |
| 8,659,749 B2 | 2/2014 | Bridges | |
| 8,670,114 B2 | 3/2014 | Bridges et al. | |
| 8,681,317 B2 | 3/2014 | Moser et al. | |
| 8,699,756 B2 | 4/2014 | Jensen | |
| 8,717,545 B2 | 5/2014 | Sebastian et al. | |
| 8,740,396 B2 | 6/2014 | Brown et al. | |
| 8,772,719 B2 | 7/2014 | Böckem | |
| 8,773,514 B2 | 7/2014 | Gharib et al. | |
| 8,773,667 B2 | 7/2014 | Edmonds et al. | |
| 8,848,203 B2 | 9/2014 | Bridges et al. | |
| 8,874,406 B2 | 10/2014 | Rotvold et al. | |
| 8,902,408 B2 | 12/2014 | Bridges | |
| 8,931,183 B2 | 1/2015 | Jonas | |
| 9,151,830 B2 | 10/2015 | Bridges | |
| 9,207,309 B2 | 12/2015 | Bridges | |
| 9,448,059 B2 | 9/2016 | Bridges et al. | |
| 9,482,514 B2 | 11/2016 | Bridges | |
| 9,482,529 B2 | 11/2016 | Becker et al. | |
| 9,664,508 B2 | 5/2017 | McAfee et al. | |
| 2001/0045534 A1 | 11/2001 | Kimura | |
| 2002/0033940 A1 | 3/2002 | Hedges et al. | |
| 2002/0093646 A1 | 7/2002 | Muraoka | |
| 2002/0148133 A1 | 10/2002 | Bridges et al. | |
| 2002/0179866 A1 | 12/2002 | Hoeller et al. | |
| 2003/0014212 A1 | 1/2003 | Ralston et al. | |
| 2003/0020895 A1 | 1/2003 | Bridges | |
| 2003/0033041 A1 | 2/2003 | Richey | |
| 2003/0035195 A1 | 2/2003 | Blech et al. | |
| 2003/0048459 A1 | 3/2003 | Gooch | |
| 2003/0066202 A1 | 4/2003 | Eaton | |
| 2003/0090682 A1 | 5/2003 | Gooch et al. | |
| 2003/0112449 A1 | 6/2003 | Tu et al. | |
| 2003/0125901 A1 | 7/2003 | Steffey et al. | |
| 2003/0133092 A1 | 7/2003 | Rogers | |
| 2003/0179362 A1 | 9/2003 | Osawa et al. | |
| 2003/0206285 A1 | 11/2003 | Lau | |
| 2003/0227616 A1 | 12/2003 | Bridges | |
| 2004/0035277 A1 | 2/2004 | Hubbs | |
| 2004/0041996 A1 | 3/2004 | Abe | |
| 2004/0075823 A1 | 4/2004 | Lewis et al. | |
| 2004/0100705 A1 | 5/2004 | Hubbs | |
| 2004/0170363 A1 | 9/2004 | Angela | |
| 2004/0189944 A1 | 9/2004 | Kaufman et al. | |
| 2004/0218104 A1 | 11/2004 | Smith et al. | |
| 2004/0223139 A1 | 11/2004 | Vogel | |
| 2005/0058179 A1 | 3/2005 | Phipps | |
| 2005/0147477 A1 | 7/2005 | Clark | |
| 2005/0179890 A1 | 8/2005 | Cramer et al. | |
| 2005/0185182 A1 | 8/2005 | Raab et al. | |
| 2005/0197145 A1 | 9/2005 | Chae et al. | |
| 2005/0254043 A1 | 11/2005 | Chiba | |
| 2005/0284937 A1 | 12/2005 | Xi et al. | |
| 2006/0009929 A1 | 1/2006 | Boyette et al. | |
| 2006/0017720 A1* | 1/2006 | Li | G01B 11/2504 345/419 |
| 2006/0053647 A1 | 3/2006 | Raab et al. | |
| 2006/0055662 A1 | 3/2006 | Rimas-Ribikauskas et al. | |
| 2006/0055685 A1 | 3/2006 | Rimas-Ribikauskas et al. | |
| 2006/0066836 A1 | 3/2006 | Bridges et al. | |
| 2006/0103853 A1 | 5/2006 | Palmateer | |
| 2006/0132803 A1 | 6/2006 | Clair et al. | |
| 2006/0140473 A1 | 6/2006 | Brooksby et al. | |
| 2006/0141435 A1 | 6/2006 | Chiang | |
| 2006/0145703 A1 | 7/2006 | Steinbichler et al. | |
| 2006/0146009 A1 | 7/2006 | Syrbe et al. | |
| 2006/0161379 A1 | 7/2006 | Ellenby et al. | |
| 2006/0164384 A1 | 7/2006 | Smith et al. | |
| 2006/0164385 A1 | 7/2006 | Smith et al. | |
| 2006/0164386 A1 | 7/2006 | Smith et al. | |
| 2006/0222237 A1 | 10/2006 | Du et al. | |
| 2006/0222314 A1 | 10/2006 | Zumbrunn et al. | |
| 2006/0235611 A1 | 10/2006 | Deaton et al. | |
| 2006/0262001 A1 | 11/2006 | Ouchi et al. | |
| 2006/0279246 A1 | 12/2006 | Hashimoto et al. | |
| 2007/0016386 A1 | 1/2007 | Husted | |
| 2007/0019212 A1 | 1/2007 | Gatsios et al. | |
| 2007/0024842 A1 | 2/2007 | Nishizawa et al. | |
| 2007/0090309 A1 | 4/2007 | Hu et al. | |
| 2007/0121095 A1 | 5/2007 | Lewis | |
| 2007/0127013 A1 | 6/2007 | Hertzman et al. | |
| 2007/0130785 A1 | 6/2007 | Bublitz et al. | |
| 2007/0236452 A1 | 10/2007 | Venkatesh et al. | |
| 2007/0247615 A1 | 10/2007 | Bridges et al. | |
| 2007/0285672 A1 | 12/2007 | Mukai et al. | |
| 2008/0002866 A1 | 1/2008 | Fujiwara | |
| 2008/0024795 A1 | 1/2008 | Yamamoto et al. | |
| 2008/0043409 A1 | 2/2008 | Kallabis | |
| 2008/0107305 A1 | 5/2008 | Vanderkooy et al. | |
| 2008/0118143 A1 | 5/2008 | Gordon et al. | |
| 2008/0122786 A1 | 5/2008 | Pryor et al. | |
| 2008/0201101 A1 | 8/2008 | Hebert et al. | |
| 2008/0203299 A1 | 8/2008 | Kozuma et al. | |
| 2008/0229592 A1 | 9/2008 | Hinderling et al. | |
| 2008/0239281 A1 | 10/2008 | Bridges | |
| 2008/0246974 A1 | 10/2008 | Wilson et al. | |
| 2008/0250659 A1 | 10/2008 | Bellerose et al. | |
| 2008/0297808 A1 | 12/2008 | Riza et al. | |
| 2008/0302200 A1 | 12/2008 | Tobey | |
| 2008/0309949 A1 | 12/2008 | Rueb | |
| 2008/0316497 A1 | 12/2008 | Taketomi et al. | |
| 2008/0316503 A1 | 12/2008 | Smarsh et al. | |
| 2009/0000136 A1 | 1/2009 | Crampton | |
| 2009/0009747 A1 | 1/2009 | Wolf et al. | |
| 2009/0033621 A1 | 2/2009 | Quinn et al. | |
| 2009/0046271 A1 | 2/2009 | Constantikes | |
| 2009/0066932 A1 | 3/2009 | Bridges et al. | |
| 2009/0078620 A1 | 3/2009 | Malek et al. | |
| 2009/0109426 A1 | 6/2009 | Cramer et al. | |
| 2009/0153817 A1 | 6/2009 | Kawakubo | |
| 2009/0157226 A1 | 6/2009 | De Smet | |
| 2009/0171618 A1 | 7/2009 | Kumagai et al. | |
| 2009/0187373 A1 | 7/2009 | Atwell et al. | |
| 2009/0190125 A1 | 7/2009 | Foster et al. | |
| 2009/0205088 A1 | 8/2009 | Crampton et al. | |
| 2009/0213073 A1 | 8/2009 | Obermeyer et al. | |
| 2009/0239581 A1 | 9/2009 | Lee | |
| 2009/0240372 A1 | 9/2009 | Bordyn et al. | |
| 2009/0240461 A1 | 9/2009 | Makino et al. | |
| 2009/0240462 A1 | 9/2009 | Lee | |
| 2009/0244260 A1* | 10/2009 | Takahashi | A61B 1/00172 348/45 |
| 2009/0244277 A1 | 10/2009 | Nagashima et al. | |
| 2009/0260240 A1 | 10/2009 | Bernhard | |

(56) References Cited

U.S. PATENT DOCUMENTS

| | | | |
|---|---|---|---|
| 2009/0284757 A1* | 11/2009 | Mayer | G01B 11/25 356/602 |
| 2010/0008543 A1 | 1/2010 | Yamada et al. | |
| 2010/0025746 A1 | 2/2010 | Chapman et al. | |
| 2010/0046005 A1 | 2/2010 | Kalkowski | |
| 2010/0058252 A1 | 3/2010 | Ko | |
| 2010/0074532 A1 | 3/2010 | Gordon et al. | |
| 2010/0091112 A1 | 4/2010 | Veeser et al. | |
| 2010/0103431 A1 | 4/2010 | Demopoulos | |
| 2010/0128259 A1 | 5/2010 | Bridges et al. | |
| 2010/0142798 A1 | 6/2010 | Weston et al. | |
| 2010/0149518 A1 | 6/2010 | Nordenfelt et al. | |
| 2010/0149525 A1 | 6/2010 | Lau | |
| 2010/0158361 A1 | 6/2010 | Grafinger et al. | |
| 2010/0176270 A1 | 7/2010 | Lau et al. | |
| 2010/0207938 A1 | 8/2010 | Yau et al. | |
| 2010/0225746 A1 | 9/2010 | Shpunt et al. | |
| 2010/0234094 A1 | 9/2010 | Gagner et al. | |
| 2010/0235786 A1 | 9/2010 | Maizels et al. | |
| 2010/0245851 A1 | 9/2010 | Teodorescu | |
| 2010/0250175 A1 | 9/2010 | Briggs et al. | |
| 2010/0250188 A1 | 9/2010 | Brown | |
| 2010/0251148 A1 | 9/2010 | Brown | |
| 2010/0265316 A1 | 10/2010 | Sali et al. | |
| 2010/0277747 A1 | 11/2010 | Rueb et al. | |
| 2010/0284082 A1 | 11/2010 | Shpunt et al. | |
| 2011/0001958 A1 | 1/2011 | Bridges et al. | |
| 2011/0003507 A1 | 1/2011 | Van Swearingen et al. | |
| 2011/0007154 A1 | 1/2011 | Vogel et al. | |
| 2011/0013281 A1 | 1/2011 | Mimura et al. | |
| 2011/0023578 A1 | 2/2011 | Grasser | |
| 2011/0025827 A1 | 2/2011 | Shpunt et al. | |
| 2011/0032507 A1 | 2/2011 | Braunecker et al. | |
| 2011/0032509 A1 | 2/2011 | Bridges et al. | |
| 2011/0035952 A1 | 2/2011 | Roithmeier | |
| 2011/0043620 A1 | 2/2011 | Svanholm et al. | |
| 2011/0043808 A1 | 2/2011 | Isozaki et al. | |
| 2011/0052006 A1 | 3/2011 | Gurman et al. | |
| 2011/0069322 A1 | 3/2011 | Hoffer, Jr. | |
| 2011/0107611 A1 | 5/2011 | Desforges et al. | |
| 2011/0107612 A1 | 5/2011 | Ferrari et al. | |
| 2011/0107613 A1 | 5/2011 | Tait | |
| 2011/0107614 A1 | 5/2011 | Champ | |
| 2011/0109502 A1 | 5/2011 | Sullivan | |
| 2011/0112786 A1 | 5/2011 | Desforges et al. | |
| 2011/0123097 A1 | 5/2011 | Van Coppenolle et al. | |
| 2011/0128625 A1 | 6/2011 | Larsen et al. | |
| 2011/0166824 A1 | 7/2011 | Haisty et al. | |
| 2011/0169924 A1 | 7/2011 | Haisty et al. | |
| 2011/0170534 A1 | 7/2011 | York | |
| 2011/0173827 A1 | 7/2011 | Bailey et al. | |
| 2011/0175745 A1 | 7/2011 | Atwell et al. | |
| 2011/0176145 A1 | 7/2011 | Edmonds et al. | |
| 2011/0179281 A1 | 7/2011 | Chevallier-Mames et al. | |
| 2011/0181872 A1 | 7/2011 | Dold et al. | |
| 2011/0260033 A1 | 10/2011 | Steffensen et al. | |
| 2011/0282622 A1 | 11/2011 | Canter | |
| 2011/0288684 A1 | 11/2011 | Farlow et al. | |
| 2011/0301902 A1 | 12/2011 | Panagas et al. | |
| 2011/0316978 A1 | 12/2011 | Dillon et al. | |
| 2012/0050255 A1 | 3/2012 | Thomas et al. | |
| 2012/0062706 A1 | 3/2012 | Keshavmurthy et al. | |
| 2012/0065928 A1 | 3/2012 | Rotvold et al. | |
| 2012/0099117 A1 | 4/2012 | Hanchett et al. | |
| 2012/0105821 A1 | 5/2012 | Moser et al. | |
| 2012/0120391 A1 | 5/2012 | Dold et al. | |
| 2012/0120415 A1 | 5/2012 | Steffensen et al. | |
| 2012/0124850 A1 | 5/2012 | Ortleb et al. | |
| 2012/0154577 A1 | 6/2012 | Yoshikawa | |
| 2012/0188559 A1 | 7/2012 | Becker et al. | |
| 2012/0194644 A1 | 8/2012 | Newcombe et al. | |
| 2012/0206716 A1 | 8/2012 | Cramer et al. | |
| 2012/0206808 A1 | 8/2012 | Brown et al. | |
| 2012/0218563 A1 | 8/2012 | Spruck et al. | |
| 2012/0236320 A1 | 9/2012 | Steffey et al. | |
| 2012/0242795 A1* | 9/2012 | Kane | G01B 11/2513 348/46 |
| 2012/0262550 A1 | 10/2012 | Bridges | |
| 2012/0262573 A1 | 10/2012 | Bridges et al. | |
| 2012/0262728 A1 | 10/2012 | Bridges et al. | |
| 2012/0265479 A1 | 10/2012 | Bridges et al. | |
| 2012/0317826 A1 | 12/2012 | Jonas | |
| 2013/0037694 A1 | 2/2013 | Steffensen et al. | |
| 2013/0096873 A1 | 4/2013 | Rosengaus et al. | |
| 2013/0100282 A1 | 4/2013 | Siercks et al. | |
| 2013/0128284 A1 | 5/2013 | Steffey et al. | |
| 2013/0155386 A1 | 6/2013 | Bridges et al. | |
| 2013/0162469 A1 | 6/2013 | Zogg et al. | |
| 2013/0197852 A1 | 8/2013 | Grau et al. | |
| 2013/0201470 A1 | 8/2013 | Cramer et al. | |
| 2013/0293684 A1 | 11/2013 | Becker et al. | |
| 2014/0002806 A1 | 1/2014 | Buchel et al. | |
| 2014/0028805 A1 | 1/2014 | Tohme et al. | |
| 2014/0267629 A1 | 9/2014 | Tohme et al. | |
| 2014/0320643 A1 | 10/2014 | Markendorf | |
| 2014/0327920 A1 | 11/2014 | Bridges et al. | |
| 2015/0049329 A1 | 2/2015 | Bridges et al. | |
| 2015/0331159 A1 | 11/2015 | Bridges et al. | |
| 2015/0365653 A1 | 12/2015 | Yazid | |
| 2015/0373321 A1 | 12/2015 | Bridges | |
| 2016/0178348 A1 | 6/2016 | Nagalla et al. | |
| 2016/0364874 A1 | 12/2016 | Tohme | |
| 2016/0377410 A1 | 12/2016 | Becker et al. | |
| 2017/0176169 A1 | 6/2017 | Nagalla et al. | |
| 2018/0120089 A1 | 5/2018 | Nagalla | |
| 2019/0137257 A1 | 5/2019 | Nagalla | |

FOREIGN PATENT DOCUMENTS

| | | |
|---|---|---|
| CA | 2811444 | 3/2012 |
| CH | 589856 A5 | 7/1977 |
| CN | 1263807 A | 8/2000 |
| CN | 1290850 A | 4/2001 |
| CN | 1362692 A | 8/2002 |
| CN | 1474159 A | 2/2004 |
| CN | 1531659 A | 9/2004 |
| CN | 1608212 A | 4/2005 |
| CN | 1846148 A | 10/2006 |
| CN | 1926400 A | 3/2007 |
| CN | 101031817 A | 9/2007 |
| CN | 101203730 A | 6/2008 |
| CN | 101297176 A | 10/2008 |
| CN | 101371160 A | 2/2009 |
| CN | 101427155 A | 5/2009 |
| CN | 101556137 A | 10/2009 |
| CN | 101750012 A | 6/2010 |
| CN | 101776982 A | 7/2010 |
| CN | 101806574 A | 8/2010 |
| CN | 201548192 U | 8/2010 |
| DE | 7704949 U1 | 6/1977 |
| DE | 3530922 A1 | 4/1986 |
| DE | 3827458 A1 | 2/1990 |
| DE | 10022054 A1 | 11/2001 |
| DE | 10160090 A1 | 7/2002 |
| DE | 202004004945 U1 | 10/2004 |
| DE | 102004024171 A1 | 9/2005 |
| DE | 102005019058 A1 | 12/2005 |
| DE | 102004052199 A1 | 4/2006 |
| DE | 102006013185 A1 | 9/2007 |
| DE | 102006049695 A1 | 4/2008 |
| DE | 202006020299 U1 | 5/2008 |
| DE | 60319016 | 4/2009 |
| DE | 202008013217 A1 | 5/2009 |
| DE | 102007058692 A1 | 6/2009 |
| DE | 102009035336 A1 | 11/2010 |
| DE | 102009040837 A1 | 3/2011 |
| DE | 112009001652 A1 | 1/2012 |
| EP | 0166106 | 1/1986 |
| EP | 0598523 A1 | 5/1994 |
| EP | 598523 A1 | 5/1994 |
| EP | 0797076 A2 | 9/1997 |
| EP | 0919831 A2 | 6/1999 |
| EP | 0957336 A2 | 11/1999 |
| EP | 1067363 A2 | 1/2001 |

(56) References Cited

FOREIGN PATENT DOCUMENTS

| | | |
|---|---|---|
| EP | 1211481 A1 | 6/2002 |
| EP | 1519141 | 3/2005 |
| EP | 1607767 A1 | 12/2005 |
| EP | 1659417 A1 | 5/2006 |
| EP | 1681533 A1 | 7/2006 |
| EP | 1710602 A1 | 10/2006 |
| EP | 1710602 B1 | 10/2006 |
| EP | 2071283 A2 | 6/2009 |
| EP | 2177868 A2 | 10/2009 |
| EP | 2136178 A1 | 12/2009 |
| EP | 2219011 A1 | 8/2010 |
| EP | 2259010 A1 | 12/2010 |
| EP | 2259013 A1 | 12/2010 |
| EP | 2275775 A2 | 1/2011 |
| EP | 2322901 A2 | 5/2011 |
| EP | 2400379 A1 | 12/2011 |
| EP | 2446300 A1 | 5/2012 |
| GB | 1543636 | 4/1979 |
| GB | 2503179 A | 12/2013 |
| GB | 2503390 A | 12/2013 |
| GB | 2516528 A | 1/2015 |
| GB | 2518544 A | 3/2015 |
| GB | 2518769 A | 4/2015 |
| GB | 2518998 A | 4/2015 |
| JP | 57147800 | 9/1982 |
| JP | 5804881 | 3/1983 |
| JP | S5848881 A | 3/1983 |
| JP | S6097288 A | 5/1985 |
| JP | 2184788 A1 | 7/1990 |
| JP | H0331715 A | 2/1991 |
| JP | H0371116 A | 3/1991 |
| JP | H0465631 A | 3/1992 |
| JP | H05257005 | 10/1993 |
| JP | H05302976 A | 11/1993 |
| JP | 6097288 | 4/1994 |
| JP | H06214186 | 8/1994 |
| JP | H06229715 A | 8/1994 |
| JP | H0665818 | 9/1994 |
| JP | H06241779 A | 9/1994 |
| JP | H06265355 A | 9/1994 |
| JP | H074967 | 1/1995 |
| JP | H07190772 A | 7/1995 |
| JP | H08145679 A | 6/1996 |
| JP | H0914965 A | 1/1997 |
| JP | H09113223 A | 5/1997 |
| JP | H102722 A | 1/1998 |
| JP | H10107357 A | 4/1998 |
| JP | H10317874 A | 12/1998 |
| JP | 11502629 A | 3/1999 |
| JP | H11304465 A | 11/1999 |
| JP | 11337642 A | 12/1999 |
| JP | 2000503476 A | 3/2000 |
| JP | 2000275042 | 10/2000 |
| JP | 2000346645 A | 12/2000 |
| JP | 2001013247 A | 1/2001 |
| JP | 2001033250 A | 2/2001 |
| JP | 2001165662 A | 6/2001 |
| JP | 2001513204 A | 8/2001 |
| JP | 2001272468 | 10/2001 |
| JP | 2001284317 A | 10/2001 |
| JP | 2001353112 A | 12/2001 |
| JP | 2002089184 A | 3/2002 |
| JP | 2002098762 | 4/2002 |
| JP | 2002139310 A | 5/2002 |
| JP | 2002209361 A | 7/2002 |
| JP | 2003506691 A | 2/2003 |
| JP | 2004508954 A | 3/2004 |
| JP | 2004527751 | 9/2004 |
| JP | 2005010585 | 1/2005 |
| JP | 3109969 U | 6/2005 |
| JP | 2005265700 A | 9/2005 |
| JP | 2006003127 A | 1/2006 |
| JP | 2006058091 A | 3/2006 |
| JP | 2006084460 A | 3/2006 |
| JP | 2006220514 A | 8/2006 |
| JP | 2006276012 A | 10/2006 |
| JP | 2006526844 A | 11/2006 |
| JP | 2007504459 A | 3/2007 |
| JP | 2007165331 A | 6/2007 |
| JP | 2007523357 A | 8/2007 |
| JP | 2007256872 A | 10/2007 |
| JP | 2008027308 A | 2/2008 |
| JP | 2004108939 A | 4/2008 |
| JP | 2008514967 | 5/2008 |
| JP | 2008536146 A | 9/2008 |
| JP | 2008544215 A | 12/2008 |
| JP | 2009014639 A | 1/2009 |
| JP | 2009134761 A | 6/2009 |
| JP | 2009523236 A | 6/2009 |
| JP | 2009229350 A | 10/2009 |
| JP | 2010169633 A | 8/2010 |
| JP | 2011158371 A | 8/2011 |
| JP | 2011526706 A | 10/2011 |
| JP | 2013525787 A | 10/2011 |
| JP | H04504468 A | 10/2011 |
| JP | 2012063352 A | 3/2012 |
| JP | 2012509464 A | 4/2012 |
| JP | 2012215496 A | 11/2012 |
| JP | 2012225869 A | 11/2012 |
| JP | 2012230097 A | 11/2012 |
| JP | 2012530909 A | 12/2012 |
| JP | 5302976 B2 | 10/2013 |
| KR | 1020090078620 | 7/2009 |
| TW | 381361 B | 2/2000 |
| WO | 9012284 | 10/1990 |
| WO | 9534849 A1 | 12/1995 |
| WO | 0109642 A1 | 2/2001 |
| WO | 0177613 A1 | 10/2001 |
| WO | 0223121 A1 | 3/2002 |
| WO | 0237466 A1 | 5/2002 |
| WO | 02084327 A2 | 10/2002 |
| WO | 03062744 A1 | 7/2003 |
| WO | 2003062744 A1 | 7/2003 |
| WO | 03073121 A1 | 9/2003 |
| WO | 2004063668 | 7/2004 |
| WO | 2005026772 A2 | 3/2005 |
| WO | 2006039682 A1 | 4/2006 |
| WO | 2006052259 A1 | 5/2006 |
| WO | 2006055770 A2 | 5/2006 |
| WO | 2006133799 A1 | 12/2006 |
| WO | 2007079601 A1 | 7/2007 |
| WO | 2007123604 A1 | 11/2007 |
| WO | 2007124010 A2 | 11/2007 |
| WO | 2008052348 A1 | 5/2008 |
| WO | 2008119073 A2 | 10/2008 |
| WO | 2008121919 A1 | 10/2008 |
| WO | 2009106141 A1 | 9/2009 |
| WO | 2010057169 A1 | 5/2010 |
| WO | 2010100043 A1 | 9/2010 |
| WO | 2010107434 A1 | 9/2010 |
| WO | 2010141120 A2 | 12/2010 |
| WO | 2010148525 A1 | 12/2010 |
| WO | 2010148526 A1 | 12/2010 |
| WO | 2011035290 | 3/2011 |
| WO | 2011057130 A2 | 5/2011 |
| WO | 2011107729 A1 | 9/2011 |
| WO | 2011112277 A1 | 9/2011 |
| WO | 2011133731 A2 | 10/2011 |
| WO | 2011134083 A1 | 11/2011 |
| WO | 2011160962 A1 | 12/2011 |
| WO | 2012142074 A2 | 10/2012 |
| WO | 2012057283 A1 | 5/2014 |
| WO | 2014143644 A1 | 9/2014 |
| WO | 2014149701 A1 | 9/2014 |
| WO | 2014149704 A1 | 9/2014 |
| WO | 2014149705 A1 | 9/2014 |
| WO | 2014149706 A1 | 9/2014 |
| WO | 2014149702 A1 | 9/2015 |

OTHER PUBLICATIONS

Japanese Office Action for Application No. 2016-500625 dated Oct. 3, 2017; 3 pgs.

(56) References Cited

OTHER PUBLICATIONS https://en.wikipedia.org/wiki/Multipath_interference (accessed Nov. 29, 2017) 2pgs.

International Preliminary Report on Patentability for International Application No. PCT/US2014/020480 dated Sep. 15, 2015; dated Sep. 24, 2015; 8 pages.

International Preliminary Report on Patentability for International Application No. PCT/US2014/020485 dated Sep. 15, 2015; dated Sep. 24, 2015; 7 pages.

International Preliminary Report on Patentability for International Application No. PCT/US2014/020487 dated Sep. 15, 2015; dated Sep. 24, 2015; 7 pages.

International Preliminary Report on Patentability for International Application No. PCT/US2014/020488 dated Sep. 15, 2015; dated Sep. 24, 2015; 7 pages.

International Preliminary Report on Patentability for International Application No. PCT/US2014/027035 dated Sep. 15, 2015; dated Sep. 24, 2015; 7 pages.

Office Action for Application No. GB1513550.2 dated Sep. 30, 2015; 4 pages.

Burge, James H., et al, Use of a commerical laser tracker for optical alignment, Proc, of SPIE vol. 6676, Sep. 21, 2007, pp. 66760E-1-66760E-12.

Chen, Jihua, et al, Research on the Principle of 5/6-DOF Laser Tracking Metrology, Journal of Astronautic Metrology and Measurement vol. 27, No. 3, May 31, 2007, pp. 58-62.

NonFinal Office Action for U.S. Appl. No. 13/932,267 dated Aug. 13, 2015; 105 pages.

"Fiber Optic Rotary Joints Product Guide"; Moog Inc; MS1071, rev. 2; p. 1-4; 2010; Retrieved on Nov. 13, 2013 from http://www.moog.com/literature/ICD/Moog-Fiber-Optic-Rotary-Joint_Catalog-en.pdf.

"Technical Brief: Fiber Optic Rotary Joint"; Document No. 303; Moog Inc; p. 1-6; 2008; Retrieved on Nov. 13, 2013 from http://www.moog.com/literature/MCG/FORJtechbrief.pdf.

Katowski "Optical 3-D Measurement Techniques—Applications in inspection, quality control and robotic" Vienna, Austria, Sep. 18-20, 1989.

Rahman, et al., "Spatial-Geometric Approach to Physical Mobile Interaction Based on Accelerometer and IR Sensory Data Fusion", ACM Transactions on Multimedia Computing, Communications and Applications, vol. 6, No. 4, Article 28, Publication date: Nov. 2010.

Brenneke et al: "Using 3D laser range data for slam in outsoor enviomments." Proceedings of the 2003 IEEE/RSJ International Conference on Intelligent Robots and Systems. Las Vegas, NV Oct. 27-31, 2003; IEEE US, vol. 1, Oct. 27, 2003, pp. 188-193.

Dipl. Ing. Karl Zeiske; : "Vermessen Leicht Gemacht"; Leica Geosystems AG, Heerbrugg, Switzerland, 2000; pp. 1-39; www.leica-geosystems.com—English Translation Attached.

Gebre, et al. "Remotely Operated and Autonomous Mapping System (ROAMS)." Technologies for Practical Robot Applications, 2009. Tepra 2009. IEEE International Conference on IEEE, Piscataway, NJ, USA. Nov. 9, 2009, pp. 173-178.

Granstrom, Karl, M et al: "Learning to Close the Loop from 3-D Point Clouds." 2010 IEEE/RSJ International Conference on Intelligent Robots and Systems (IROS), Piscataway, NJ, Oct. 18, 2010, pp. 1-7.

Hebert P., "A self-referenced hand-held range sensor", 3-D Digital Imaging and Modeling, 2001, Proceedings, Third anual International Conference on May 28-Jun. 1, 2001, Piscataway, NJ, USA, IEEE, May 28, 2001, pp. 5-12.

Henry, P., et al: "RGB-D Mapping; Using Kinnect-style Depth Cameras for Dense 3-D Modeling of Indoor Enviornments." The International Journal of Robitcs Research, vol. 31, No. 5, Feb. 10, 2012, pp. 647-663.

Lee, Wonwoo, et al.:"Panoramic Mesh Model Generation From Multiple Range Data for Indoor Screen Reconstruction." Advances in Multimedia Information Processing, PCM Lecture Notes in Computer Science, Jan. 1, 2005, Berlin, DE, pp. 1004-1014.

May S. et al; "Robust 3-D Mapping with time-of-flight cameras." Intelligent Robots and Systems, IROS 2009. IEEE/RSJ Internation Conference. Piscataway, NJ Oct. 10, 2009, pp. 1-6.

Surmann et al. "An autonomous mobile robot with a 3D laser range finder for 3D exploration and digitalization of indoor enviornments." Robotics and Autonomous Systems vol. 45 No. 3-4, Dec. 31, 2003, pp. 181-198. Amsterdamn, Netherlands.

Weise, Thibaut, et al.:"Online Loop Closure for real-time interactive 3-D scanning." Computer Vision and Image Understanding, vol. 115, No. 5, May 1, 2011, pp. 635-648.

Newport Company "Fiber Optic Scribes" https://web.archive.org/web/20120903063012/http://www.newport.com/Fiber-Optic-Scribes/835171/1033/info.aspx; 2012, 2 pages.

Newport Corporation "Projects in Fiber Optics: Applications Handbook", 1986; 3 pages.

Office Action for Application No. 112014001459.1 dated Feb. 11, 2016; 6 pages.

Takeuchi et al., "Ultraprecision 3D Micromachining of Glass"; Annals of the CIRP; Jan. 4, 1996; vol. 45; 401-404 pages.

Thorlabs "Ruby Dualscribe Fiber Optic Scribe" a Mechanical Drawing, 2014, 1 page.

Bridges, et al., "Diagnosing Multipath Interference and Eliminating Multipath Interference in 3D Scanners Using Projection Patterns" U.S. Appl. No. 14/139,021, filed Dec. 23, 2013.

International Preliminary Report on Patentability of the International Searching Authority for PCT No. PCT/US2012/024629; report dated Aug. 21, 2013.

International Search Report of the International Searching Authority for PCT No. PCT/US2012/024629; dated May 15, 2012.

Kester, Walt, Practical Analog Design Techniques, Analog Devices, Section 5, Undersampling Applications, Copyright 1995, pp. 5-1 to 5-34.

Non Final Office Action for U.S. Appl. No. 13/832,658, dated Oct. 2, 2014, 92 pages.

Written Opinion of the International Searching Authority for PCT No. PCT/US2012/024629; dated May 15, 2012.

Written Opinion of the International Searching Authority for PCT/US2012/032715; dated Jul. 5, 2012.

Notice of Allowance for U.S. Appl. No. 14/199,211 dated Aug. 21, 2014, pp. 1-42.

Non Final Office Action for U.S. Appl. No. 14/139,143 dated Jan. 6, 2016; 142 pages.

Office Action for Japanese Patent Application No. 2016-500622 dated Mar. 15, 2016; 3 pages.

International Search report of the International Application No. PCT/US2013/049562 dated Jun. 20, 2014.

International Search report of the International Application No. PCT/US2014/020481 dated Jun. 20, 2014.

International Search report of the International Application No. PCT/US2014/020487 dated Jun. 20, 2014.

International Search report of the International Application No. PCT/US2014/020488 dated Jun. 23, 2014.

International Search report of the International Application No. PCT/US2014/027035 dated Jun. 20, 2014.

Hanwei Xiong et al: "The Development of Optical Fringe Measurement System Integrated with a CMM for Products Inspection." Proceedings of SPIE, vol. 7855, Nov. 3, 2010, pp. 78551W-7855W-8, XP055118356. ISSN: 0277-786X.

Jsladek et al: "The Hybrid Contact-Optical Coordinate Measuring System." Measurement, vol. 44, No. 3, Mar. 1, 2011, pp. 503-510, XPO55047404, ISSN: 0263-2241.

Written Opinion of the International Searching Authority for International Application No. PCT/US2014/020480 dated Jun. 20, 2014.

Written Opinion of the International Searching Authority for International Application No. PCT/US2014/020481 dated Jun. 20, 2014.

Written Opinion of the International Searching Authority for International Application No. PCT/US2014/020485 dated Jun. 20, 2014.

Written Opinion of the International Searching Authority for International Application No. PCT/US2014/020487 dated Jun. 20, 2014.

Written Opinion of the International Searching Authority for International Application No. PCT/US2014/020488 dated Jun. 23, 2014.

Written Opinion of the International Searching Authority for International Application No. PCT/US2014/027035 dated Jun. 20, 2014.

(56) References Cited

OTHER PUBLICATIONS

2×2 High Speed Lithium Niobate Interferometric Switch; [on-line]; JDS Uniphase Corporation; 2007; Retreived from www.jdsu.com.
AO Modulator—M040-8J-FxS; [online—technical data sheet]; Gooch & Housego; Nov. 2006; Retreived from http://www.goochandhousego.com/.
Automated Precision, Inc., Product Specifications, Radian, Featuring INNOVO Technology, info@apisensor.com, Copyright 2011.
Cao, et al."VisionWand: Interaction Techniques for Large Displays using a Passive Wand Tracked in 3D", Proceedings of the 16th Annual ACM Symposium on User Interface Software and Technology, UIST, vol. 5, iSSUE 2, pp. 173-182, (Jan. 2003).
Chen, Junewen, "Novel Laser Range Finding Algorithms", Proceedings of SPIE, vol. 6100, Jan. 1, 2006, pp. 61001Q-61001Q-8, XP55031002, ISSN: 0277-786X, DOI: 10.1117/12.645131, the whole document.
Computer Giants Embrace On-Chip Optics; Mar. 27, 2008; [on-line]; Optics.org; [Retreived on Apr. 2, 2008]; Retreived from http://optics.org/cws/article/research/33521.
EOSpace—High-Speed Swtiches; [on-line technical brochure]; [Retreived May 18, 2009]; Retreived from http://www.cospace.com/Switches.htm.
FARO Laser Tracker ION; 2 pages; revised Apr. 23, 2010; FARO Technologies, Inc., www.lasertracker.faro.com.
FARO Technical Institute, Basic Measurement Training Workbook, Version 1.0, FARO Laster Tracker, Jan. 2008, Students Book, FAO CAM2 Measure.
Hecht, Jeff, Photonic Frontiers: Gesture Recognition: Lasers Bring Gesture Recognition to the Home, Laser Focus World, pp. 1-5, [Retrieved On-Line Mar. 3, 2011], http://www.optoiq.com/optoiq-2/en-us/index/photonics-technologiesapplications/lfw-display/lfw.
Hui E et al: "Single-Step Assembly of Complex 3-D microstructures." Jan. 23, 2000, pp. 602-607, XP010377196.
Integrated Optical Amplitude Modulator; [on-line technical data sheet]; [Retreived Oct. 14, 2010]; Jenoptik; Retreived from http://www.jenoptik.com/cms/products.nsf/0/A6DF20B50AEE7819C12576FE0074E8E6/$File/amplitudemodulators_en.pdf?Open.
Turk, et al., "Perceptual Interfaces", UCSB Technical Report 2003-33, pp. 1-43 [Retrieved Aug. 11, 2011, http://www.cs.ucsb.edu/research/tech_reports/reports/2003-33.pdf] (2003).
Kollorz, et al., "Gesture recognition with a time-of-flight camera", International Journal of Intelligent Systems Technologies and Applications, vol. 5, No. 3/4, pp. 334-343, [Retrieved Aug. 11, 2011; http://www5.informatik.unierlangen.
LaserTRACER—measureing sub-micron in space; http://www.etalon-ag.com/index.php/products/lasertracer; 4 pages; Jun. 28, 2011; ETALON AG.
Leica Absolute Tracker AT401-ASME B89.4. 19-2006 Specifications; Hexagon Metrology; Leica Geosystems Metrology Products, Switzerland; 2 pages; www.leica-geosystems.com/metrology.
Leica Geosystems AG ED—"Leica Laser Tracker System", Internet Citation, Jun. 28, 2012 (Jun. 28, 2012), XP002678836, Retrieved from the Internet: URL:http://www.a-solution.com.au/pages/downloads/LTD500_Brochure_EN.pdf.
Leica Geosystems Metrology, "Leica Absolute Tracker AT401, White Paper," Hexagon AB; 2010.
Leica Geosystems: "TPS1100 Professional Series", 1999, Retrieved from the Internet: URL:http://www.estig.ipbeja.pt/~legvm/top_civil/TPS1100%20-%20A%20New%20Generation%20of%20Total%20Stations.pdf, [Retrieved on Jul. 2012] the whole document.
Leica Laser Tracker System, Leica Geosystems AG, Jan. 1, 1999, XP002678836, Retrieved from the Internet: URL:http://www.a-solution.com.au/pages/downloads/LTD500_Brochure_EN.pdf [retrieved on 2012] the whole document.
Li, et al., "Real Time Hand Gesture Recognition using a Range Camera", Australasian Conference on Robotics and Automation (ACRA), [Retreived Aug. 10, 2011, http://www.araa.asn.au/acra/acra2009/papers/pap128s1.pdf] pp. 1-7 (2009).

Lightvision—High Speed Variable Optical Attenuators (VOA); [on-line]; A publication of Lightwaves 2020, Feb. 1, 2008; Retreived from http://www.lightwaves2020.com/home/.
Maekynen, A. J. et al., Tracking Laser Radar for 3-D Shape Measurements of Large Industrial Objects Based on Timeof-Flight Laser Rangefinding and Position-Sensitive Detection Techniques, IEEE Transactions on Instrumentation and Measurement, vol. 43, No. 1, Feb. 1994.
Making the Big Step from Electronics to Photonics by Modulating a Beam of Light with Electricity; May 18, 2005; [online]; [Retreived May 7, 2009]; Cornell University News Service; Retreived from http://www.news.cornell.edu/stories/May05/LipsonElectroOptica.
MEMS Variable Optical Attenuators Single/Multi-Channel; [on-line]; Jan. 17, 2005; Retreived from www.ozoptics.com.
Nanona High Speed & Low Loss Optical Swtich; [on-line technical data sheet]; [Retreived Oct. 14, 2010]; Retreived from http://www.bostonati.com/products/PI-FOS.pdf.
New River Kinematics, SA Arm—The Ultimate Measurement Software for Arms, Software Release! SA Sep. 30, 2010, [On-line], http://www.kinematics.com/news/software-release-sa20100930.html (1 of 14), [Retreived Apr. 13, 2011 11:40:47 AM].
Super-Nyquist Operation of the AD9912 Yields a High RF output Signal; Analog Devices, Inc., AN-939 Application Note; www.analog.com; Copyright 2007.
Tracker3; Ultra-Portable Laser Tracking System; 4 pages; 2010 Automated Precision Inc.; www.apisensor.com.
Optical Circulator (3-Ports & 4-Ports); [on-line technical data sheet]; Alliance Fiber Optic Products, Inc. Rev.D Jan. 15, 2004; Retrieved from www.afop.com.
Optical Circulators Improve Bidirectional Fiber Systems; By Jay S. Van Delden; [onlin]; [Retreived May 18, 2009]; Laser Focus World; Retreived from http://www.laserfocusworld.com/display_article/28411/12/nonc/nonc/News/Opticalcirculators-improve-bidirectional-fiber-systems.
Ou-Yang, Mang, et al., "High-Dynamic-Range Laser Range Finders Based on a Novel Multimodulated Frequency Method", Optical Engineering, vol. 45, No. 12, Jan. 1, 2006, p. 123603, XP55031001, ISSN: 0091-3286, DOI: 10.1117/1.2402517, the whole document.
PCMM System Specifications Leica Absolute Tracker and Leica T-Products; Hexagon Metrology; Leica Geosystems Metrology Products, Switzerland; 8 pages; www.leica-geosystems.com/metrology.
Poujouly, Stephane, et al., "A Twofold Modulation Frequency Laser Range Finder; A Twofold Modulation Frequency Laser Range Finder", Journal of Optics. A, Pure and Applied Optics, Institute of Physics Publishing, Bristol, GB, vol. 4, No. 6, Nov. 1, 2 36.
Poujouly, Stephane, et al., Digital Laser Range Finder: Phase-Shift Estimation by Undersampling Technique; IEEE, Copyright 1999.
RS Series Remote Controlled Optical Switch; [on-line technical data sheet]; Sercalo Microtechnology, Ltd. [Retreived Oct. 14, 2010]; Retreived from http://www.sercalo.com/document/PDFs/DataSheets/RS%20datasheet.pdf.
"DLP-Based Structured Light 3D Imaging Technologies and Applications" by J. Geng; Proceedings of SPIE, vol. 7932. Published Feb. 11, 2011, 15 pages.
Matsumaru, K., "Mobile Robot with Preliminary-Announcement and Display Function of Forthcoming Motion Using Projection Equipment," Robot and Human Interactive Communication, 2006. RO-MAN06. The 15th IEEE International Symposium, pp. 443-450, Sep. 6-8.
Stone, et al. "Automated Part Tracking on the Construction Job Site" 8 pp; XP 55055816A; National Institute of Standards and Technology.
Parker, et al "Instrument for Setting Radio Telescope Surfaces" (4 pp) XP 55055817A.
International Search Report dated Mar. 19, 2013 for International Application Serial No. PCT/US2013/022515; International filing date Jan. 22, 2013. All references cited incorporated herein.
Cuypers, et al "Optical Measurement Techniques for Mobile and Large-Scale Dimensional Metrology" (2009) ; Optics and Lasers in Engineering pp. 292-300; vol. 47; Elsevier Ltd. XP 25914917A.

(56) References Cited

OTHER PUBLICATIONS

Written Opinion of the International Searching Authority dated Mar. 19, 2013 for International Application Serial No. PCT/US2013/022515; International filing date Jan. 22, 2013. All references cited incorporated herein.

\* cited by examiner

DIAGNOSING MULTIPATH INTERFERENCE AND ELIMINATING MULTIPATH INTERFERENCE IN 3D SCANNERS USING PROJECTION PATTERNS

CROSS REFERENCE TO RELATED APPLICATIONS

This application is a Continuation application of U.S. patent application Ser. No. 14/139,021 dated Dec. 23, 2013, which is a nonprovisional patent application which claims the benefit of U.S. Provisional Patent Application No. 61/791,797 filed Mar. 15, 2013, the entire contents of which are incorporated herein by reference. U.S. patent Ser. No. 14/139,021 is further a Continuation In Part of U.S. patent application Ser. No. 13/443,946, filed on Apr. 11, 2012. U.S. patent application Ser. No. 13/443,946 is a nonprovisional application of U.S. Provisional Application 61/592,049 filed on Jan. 30, 2012 and U.S. Provisional Application 61/475,703 filed on Apr. 15, 2011. The contents of all of which are incorporated by reference herein in their entirety.

BACKGROUND OF THE INVENTION

The subject matter disclosed herein relates to a three-dimensional coordinate scanner and in particular to a triangulation-type scanner having multiple modalities of data acquisition.

The acquisition of three-dimensional coordinates of an object or an environment is known. Various techniques may be used, such as time-of-flight or triangulation methods for example. A time-of-flight systems such as a laser tracker, total station, or time-of-flight scanner may direct a beam of light such as a laser beam toward a retroreflector target or a spot on the surface of the object. An absolute distance meter is used to determine the distance to the target or spot based on length of time it takes the light to travel to the target or spot and return. By moving the laser beam or the target over the surface of the object, the coordinates of the object may be ascertained. Time-of-flight systems have advantages in having relatively high accuracy, but in some cases may be slower than some other systems since time-of-flight systems must usually measure each point on the surface individually.

In contrast, a scanner that uses triangulation to measure three-dimensional coordinates projects onto a surface either a pattern of light in a line (e.g. a laser line from a laser line probe) or a pattern of light covering an area (e.g. structured light) onto the surface. A camera is coupled to the projector in a fixed relationship, by attaching a camera and the projector to a common frame for example. The light emitted from the projector is reflected off of the surface and detected by the camera. Since the camera and projector are arranged in a fixed relationship, the distance to the object may be determined using trigonometric principles. Compared to coordinate measurement devices that use tactile probes, triangulation systems provide advantages in quickly acquiring coordinate data over a large area. As used herein, the resulting collection of three-dimensional coordinate values provided by the triangulation system is referred to as a point cloud data or simply a point cloud.

A number of issues may interfere with the acquisition of high accuracy point cloud data when using a laser scanner. These include, but are not limited to: variations in the level of light received over the camera image plane as a result in variations in the reflectance of the object surface or variations in the angle of incidence of the surface relative to the projected light; low resolution near edge, such as edges of holes; and multipath interference for example. In some cases, the operator may be unaware of or unable to eliminate a problem. In these cases, missing or faulty point cloud data is the result.

Accordingly, while existing scanners are suitable for their intended purpose the need for improvement remains, particularly in providing a scanner that can adapt to undesirable conditions and provide improved data point acquisition.

BRIEF DESCRIPTION OF THE INVENTION

According to one aspect of the invention, a noncontact optical three-dimensional measuring device is provided. The noncontact optical three-dimensional comprises: an assembly that includes a projector, a first camera, and a second camera, wherein the projector, the first camera, and the second camera are fixed in relation to one another, there being a first distance between the projector and the first camera and a second distance between the projector and the second camera, the projector having a light source, the projector configured to emit onto a surface of an object a first light having any of a plurality of spatially varying patterns, the first camera having a first lens and a first photosensitive array, the first camera configured to receive a first portion of the first light reflected off the surface and to produce a first digital signal in response, the first camera having a first field of view, the first field of view being a first angular viewing region of the first camera, the second camera having a second lens and a second photosensitive array, the second camera configured to receive a second portion of the first light reflected off the surface and to produce a second digital signal in response, the second camera having a second field of view, the second field of view being a second angular viewing region of the second camera, the second field of view being different than the first field of view; a processor electrically coupled to the projector, the first camera and the second camera; and computer readable media which, when executed by the processor, causes the first digital signal to be collected at a first time and the second digital signal to be collected at a second time different than the first time and determines three-dimensional coordinates of a first point on the surface based at least in part on the first digital signal and the first distance and determines three-dimensional coordinates of a second point on the surface based at least in part on the second digital signal and the second distance.

According to one aspect of the invention, a method of determining three-dimensional coordinates on a surface of an object is provided. The method comprises: providing an assembly that includes a projector, a first camera, and a second camera, wherein the projector, the first camera, and the second camera are fixed in relation to one another, there being a first distance between the projector and the first camera and a second distance between the projector and the second camera, the projector having a light source, the projector configured to emit onto the surface a first light having any of a plurality of spatially varying patterns, the first camera having a first lens and a first photosensitive array, the first camera configured to receive a first portion of the first light reflected off the surface, the first camera having a first field of view, the first field of view being a first angular viewing region of the first camera, the second camera having a second lens and a second photosensitive array, the second camera configured to receive a second portion of the first light reflected off the surface, the second camera having a second field of view, the second field of view being a second angular viewing region of the second camera, the second field of view being different than the first field of view;

providing a processor electrically coupled to the projector, the first camera and the second camera; emitting from the projector onto the surface, in a first instance, the first light having a first pattern selected from among the plurality of spatially varying patterns; acquiring in the first instance a first image of the surface with the first camera and sending a first digital signal to the processor in response; determining a first set of three-dimensional coordinates of first points on the surface, the first set based at least in part on the first pattern, the first digital signal and the first distance; carrying out a diagnostic procedure to evaluate quality of the first set; determining a second pattern of the first light selected from among the plurality of spatially varying patterns, the second pattern based at least in part on results of the diagnostic procedure; emitting from the projector onto the surface, in a second instance, the first light having the second pattern; acquiring in the second instance a second image of the surface with the second camera and sending a second digital signal to the processor in response; and determining a second set of three-dimensional coordinates of second points on the surface, the second set based at least in part on the second pattern, the second digital signal, and the second distance.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

Figure 1:
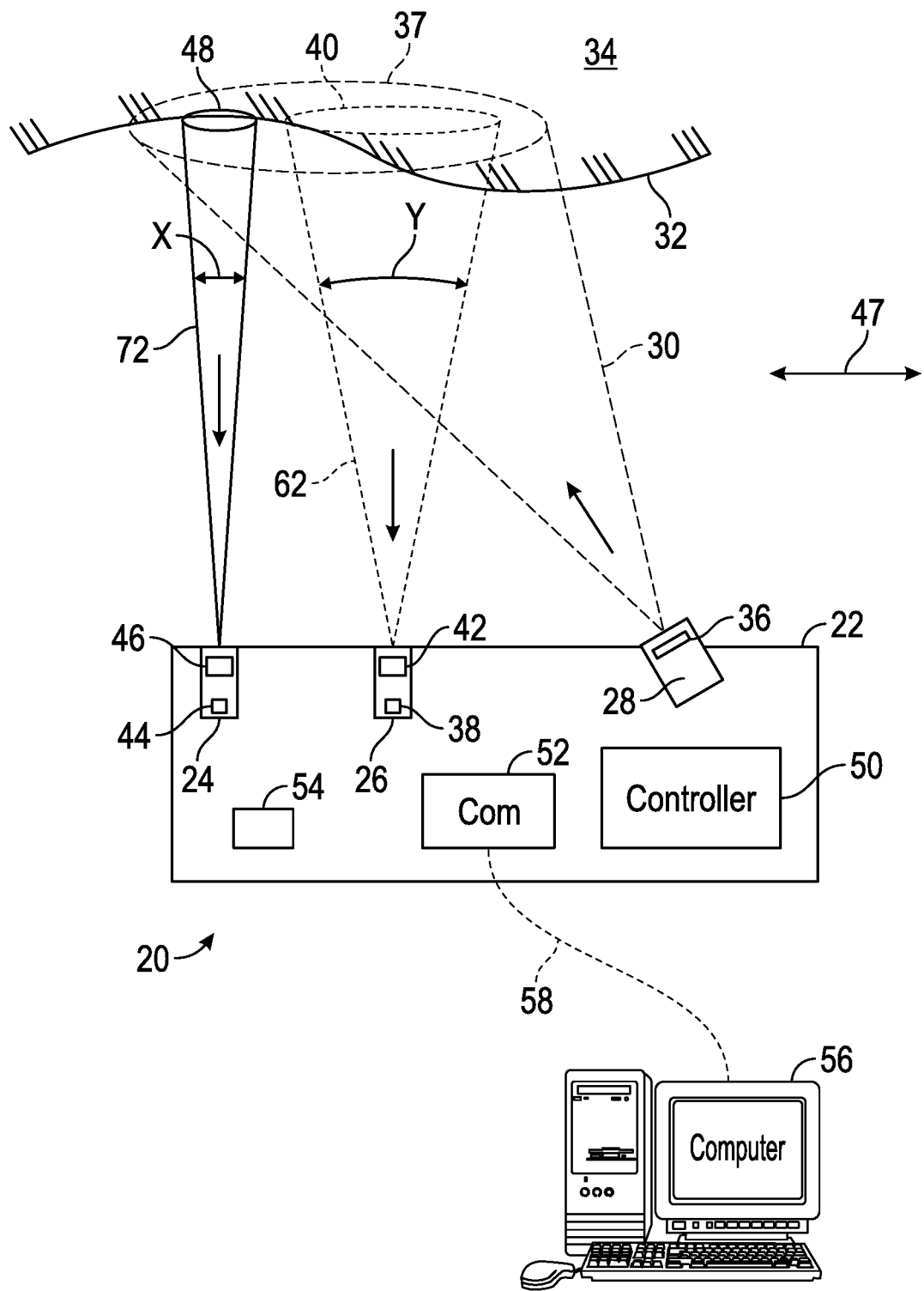
FIG. 1 is a top schematic view of a scanner in accordance with an embodiment of the invention.

The detailed description explains embodiments of the invention, together with advantages and features, by way of example with reference to the drawings.

DETAILED DESCRIPTION OF THE INVENTION

Embodiments of the present invention provide advantages increasing the reliability and accuracy of three-dimensional coordinates of a data point cloud acquired by a scanner. Embodiments of the invention provide advantages in detecting anomalies in acquired data and automatically adjusting the operation of the scanner to acquire the desired results. Embodiments of the invention provide advantages in detecting anomalies in the acquired data and providing indication to the operator of areas where additional data acquisition is needed. Still further embodiments of the invention provide advantages in detecting anomalies in the acquired data and providing indication to the operator where additional data acquisition may be acquired with a remote probe.

Scanner devices acquire three-dimensional coordinate data of objects. In one embodiment, a scanner 20 shown in FIG. 1 has a housing 22 that includes a first camera 24, a second camera 26 and a projector 28. The projector 28 emits light 30 onto a surface 32 of an object 34. In the exemplary embodiment, the projector 28 uses a visible light source that illuminates a pattern generator. The visible light source may be a laser, a superluminescent diode, an incandescent light, a Xenon lamp, a light emitting diode (LED), or other light emitting device for example. In one embodiment, the pattern generator is a chrome-on-glass slide having a structured light pattern etched thereon. The slide may have a single pattern or multiple patterns that move in and out of position as needed. The slide may be manually or automatically installed in the operating position. In other embodiments, the source pattern may be light reflected off or transmitted by a digital micro-mirror device (DMD) such as a digital light projector (DLP) manufactured by Texas Instruments Corporation, a liquid crystal device (LCD), a liquid crystal on silicon (LCOS) device, or a similar device used in transmission mode rather than reflection mode. The projector 28 may further include a lens system 36 that alters the outgoing light to cover the desired area.

In this embodiment, the projector 28 is configurable to emit a structured light over an area 37. As used herein, the term "structured light" refers to a two-dimensional pattern of light projected onto an area of an object that conveys information which may be used to determine coordinates of points on the object. In one embodiment, a structured light pattern will contain at least three non-collinear pattern elements disposed within the area. Each of the three non-collinear pattern elements conveys information which may be used to determine the point coordinates. In another embodiment, a projector is provided that is configurable to project both an area pattern as well as a line pattern. In one embodiment, the projector is a digital micromirror device (DMD), which is configured to switch back and forth between the two. In one embodiment, the DMD projector may also sweep a line or to sweep a point in a raster pattern.

In general, there are two types of structured light patterns, a coded light pattern and an uncoded light pattern. As used herein a coded light pattern is one in which the three dimensional coordinates of an illuminated surface of the object are found by acquiring a single image. With a coded light pattern, it is possible to obtain and register point cloud data while the projecting device is moving relative to the object. One type of coded light pattern contains a set of elements (e.g. geometric shapes) arranged in lines where at least three of the elements are non-collinear. Such pattern elements are recognizable because of their arrangement.

In contrast, an uncoded structured light pattern as used herein is a pattern that does not allow measurement through a single pattern. A series of uncoded light patterns may be projected and imaged sequentially. For this case, it is usually necessary to hold the projector fixed relative to the object.

It should be appreciated that the scanner 20 may use either coded or uncoded structured light patterns. The structured light pattern may include the patterns disclosed in the journal article "DLP-Based Structured Light 3D Imaging Technologies and Applications" by Jason Geng published in the Proceedings of SPIE, Vol. 7932, which is incorporated herein by reference. In addition, in some embodiments described herein below, the projector 28 transmits a pattern formed a swept line of light or a swept point of light. Swept lines and points of light provide advantages over areas of light in identifying some types of anomalies such as multipath interference. Sweeping the line automatically while the scanner is held stationary also has advantages in providing a more uniform sampling of surface points.

The first camera 24 includes a photosensitive sensor 44 which generates a digital image/representation of the area 48 within the sensor's field of view. The sensor may be charged-coupled device (CCD) type sensor or a complementary metal-oxide-semiconductor (CMOS) type sensor for example having an array of pixels. The first camera 24 may further include other components, such as but not limited to lens 46 and other optical devices for example. The lens 46 has an associated first focal length. The sensor 44 and lens 46 cooperate to define a first field of view "X". In the exemplary embodiment, the first field of view "X" is 16 degrees (0.28 inch per inch).

Similarly, the second camera 26 includes a photosensitive sensor 38 which generates a digital image/representation of the area 40 within the sensor's field of view. The sensor may be charged-coupled device (CCD) type sensor or a complementary metal-oxide-semiconductor (CMOS) type sensor for example having an array of pixels. The second camera 26 may further include other components, such as but not limited to lens 42 and other optical devices for example. The lens 42 has an associated second focal length, the second focal length being different than the first focal length. The sensor 38 and lens 42 cooperate to define a second field of view "Y". In the exemplary embodiment, the second field of view "Y" is 50 degrees (0.85 inch per inch). The second field of view Y is larger than the first field of view X. Similarly, the area 40 is larger than the area 48. It should be appreciated that a larger field of view allows acquired a given region of the object surface 32 to be measured faster; however, if the photosensitive arrays 44 and 38 have the same number of pixels, a smaller field of view will provide higher resolution.

In the exemplary embodiment, the projector 28 and the first camera 24 are arranged in a fixed relationship at an angle such that the sensor 44 may receive light reflected from the surface of the object 34. Similarly, the projector 28 and the second camera 26 are arranged in a fixed relationship at an angle such that the sensor 38 may receive light reflected from the surface 32 of object 34. Since the projector 28, first camera 24 and second camera 26 have fixed geometric relationships, the distance and the coordinates of points on the surface may be determined by their trigonometric relationships. Although the fields-of-view (FOVs) of the cameras 24 and 26 are shown not to overlap in FIG. 1, the FOVs may partially overlap or totally overlap.

The projector 28 and cameras 24, 26 are electrically coupled to a controller 50 disposed within the housing 22. The controller 50 may include one or more microprocessors, digital signal processors, memory and signal conditioning circuits. The scanner 20 may further include actuators (not shown) which may be manually activated by the operator to initiate operation and data capture by the scanner 20. In one embodiment, the image processing to determine the X, Y, Z coordinate data of the point cloud representing the surface 32 of object 34 is performed by the controller 50. The coordinate data may be stored locally such as in a volatile or nonvolatile memory 54 for example. The memory may be removable, such as a flash drive or a memory card for example. In other embodiments, the scanner 20 has a communications circuit 52 that allows the scanner 20 to transmit the coordinate data to a remote processing system 56. The communications medium 58 between the scanner 20 and the remote processing system 56 may be wired (e.g. Ethernet) or wireless (e.g. Bluetooth, IEEE 802.11). In one embodiment, the coordinate data is determined by the remote processing system 56 based on acquired images transmitted by the scanner 20 over the communications medium 58.

A relative motion is possible between the object surface 32 and the scanner 20, as indicated by the bidirectional arrow 47. There are several ways in which such relative motion may be provided. In an embodiment, the scanner is a handheld scanner and the object 34 is fixed. Relative motion is provided by moving the scanner over the object surface. In another embodiment, the scanner is attached to a robotic end effector. Relative motion is provided by the robot as it moves the scanner over the object surface. In another embodiment, either the scanner 20 or the object 34 is attached to a moving mechanical mechanism, for example, a gantry coordinate measurement machine or an articulated arm CMM. Relative motion is provided by the moving mechanical mechanism as it moves the scanner 20 over the object surface. In some embodiments, motion is provided by the action of an operator and in other embodiments, motion is provided by a mechanism that is under computer control.

Figure 2:
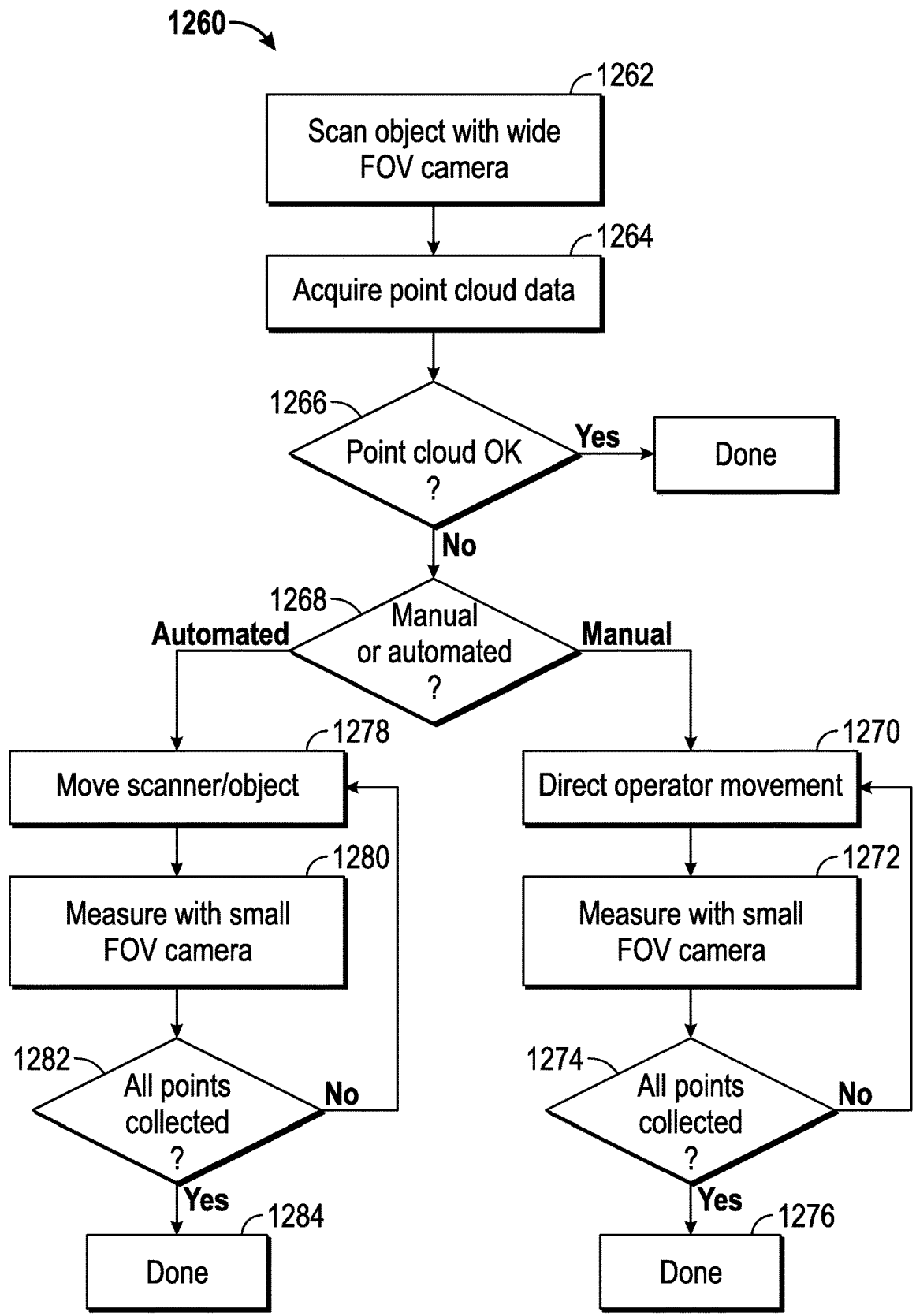
FIG. 2 is a flow chart showing a method of operating the scanner of FIG. 1.

Referring now to FIG. 2, the operation of the scanner 20 according to a method 1260 is described. As shown in block 1262, the projector 28 first emits a structured light pattern onto the area 37 of surface 32 of the object 34. The light 30 from projector 28 is reflected from the surface 32 as reflected light 62 received by the second camera 26. The three-dimensional profile of the surface 32 affects the image of the pattern captured by the photosensitive array 38 within the second camera 26. Using information collected from one or more images of the pattern or patterns, the controller 50 or the remote processing system 56 determines a one to one correspondence between the pixels of the photosensitive array 38 and pattern of light emitted by the projector 28. Using this one-to-one correspondence, triangulation principals are used to determine the three-dimensional coordinates of points on the surface 32. This acquisition of three-dimensional coordinate data (point cloud data) is shown in block 1264. By moving the scanner 20 over the surface 32, a point cloud may be created of the entire object 34.

During the scanning process, the controller 50 or remote processing system 56 may detect an undesirable condition or problem in the point cloud data, as shown in block 1266. Methods for detecting such a problem are discussed hereinbelow with regard to FIG. 12. The detected problem may be an error in or absence of point cloud data in a particular area for example. This error in or absence of data may be caused by too little or too much light reflected from that area. Too little or too much reflected light may result from a difference in reflectance over the object surface, for example, as a result of high or variable angles of incidence of the light 30 on the object surface 32 or as a result of low reflectance (black or transparent) materials or shiny surfaces. Certain points on the object may be angled in such as way as to produce a very bright specular reflectance known as a glint.

Another possible reason for an error in or absence of point cloud data is a lack of resolution in regions having fine features, sharp edges, or rapid changes in depth. Such lack of resolution may be the result of a hole, for example.

Another possible reason for an error in or an absence of point cloud data is multipath interference. Ordinarily a ray of light from the projector 28 strikes a point on the surface 32 and is scattered over a range of angles. The scattered light is imaged by the lens 42 of camera 26 onto a small spot on the photosensitive array 38. Similarly, the scattered light may be imaged by the lens 46 of camera 24 onto a small spot on the photosensitive array 44. Multipath interference occurs when the light reaching the point on the surface 32 does not come only from the ray of light from the projector 28 but in addition, from secondary light is reflected off another portion of the surface 32. Such secondary light may compromise the pattern of light received by the photosensitive array 38, 44, thereby preventing accurate determination of three-dimensional coordinates of the point. Methods for identifying the presence of multipath interference are described in the present application with regard to FIG. 12.

If the controller determines that the point cloud is all right in block 1266, the procedure is finished. Otherwise, a determination is made in block 1268 of whether the scanner is used in a manual or automated mode. If the mode is manual, the operator is directed in block 1270 to move the scanner into the desired position.

There are many ways that the movement desired by the operator may be indicated. In an embodiment, indicator lights on the scanner body indicate the desired direction of movement. In another embodiment, a light is projected onto the surface indicating the direction over which the operator is to move. In addition, a color of the projected light may indicate whether the scanner is too close or too far from the object. In another embodiment, an indication is made on display of the region to which the operator is to project the light. Such a display may be a graphical representation of point cloud data, a CAD model, or a combination of the two. The display may be presented on a computer monitor or on a display built into the scanning device.

In any of these embodiments, a method of determining the approximate position of the scanner is desired. In one case, the scanner may be attached to an articulated arm CMM that uses angular encoders in its joints to determine the position and orientation of the scanner attached to its end. In another case, the scanner includes inertial sensors placed within the device. Inertial sensors may include gyroscopes, accelerometers, and magnetometers, for example. Another method of determining the approximate position of the scanner is to illuminate photogrammetric dots placed on or around the object as marker points. In this way, the wide FOV camera in the scanner can determine the approximate position of the scanner in relation to the object.

In another embodiment, a CAD model on a computer screen indicates the regions where additional measurements are desired, and the operator moves the scanner according by matching the features on the object to the features on the scanner. By updating the CAD model on the screen as a scan is taken, the operator may be given rapid feedback whether the desired regions of the part have been measured.

After the operator has moved the scanner into position, a measurement is made in block 1272 with the small FOV camera 24. By viewing a relatively smaller region in block 1272, the resolution of the resulting three-dimensional coordinates is improved and better capability is provided to characterize features such as holes and edges.

Because the narrow FOV camera views a relatively smaller region than the wide FOV camera, the projector 28 may illuminate a relatively smaller region. This has advantages in eliminating multipath interference since there is relatively fewer illuminated points on the object that can reflect light back onto the object. Having a smaller illuminated region may also make it easier to control exposure to obtain the optimum amount of light for a given reflectance and angle of incidence of the object under test. In the block 1274, if all points have been collected, the procedure ends at block 1276; otherwise it continues.

In an embodiment where the mode from block 1268 is automated, then in block 1278 the automated mechanism moves the scanner into the desired position. In some embodiments, the automated mechanism will have sensors to provide information about the relative position of the scanner and object under test. For an embodiment in which the automated mechanism is a robot, angular transducers within the robot joints provide information about the position and orientation of the robot end effector used to hold the scanner. For an embodiment in which the object is moved by another type of automated mechanism, linear encoders or a variety of other sensors may provide information on the relative position of the object and the scanner.

After the automated mechanism has moved the scanner or object into position, then in block 1280 three-dimensional measurements are made with the small FOV camera. Such measurements are repeated by means of block 1282 until all measurements are completed and the procedure finishes at block 1284.

In one embodiment, the projector 28 changes the structured light pattern when the scanner switches from acquiring data with the second camera 26 to the first camera 24. In another embodiment, the same structured light pattern is used with both cameras 24, 26. In still another embodiment, the projector 28 emits a pattern formed by a swept line or point when the data is acquired by the first camera 24. After acquiring data with the first camera 24, the process continues scanning using the second camera 26. This process continues until the operator has either scanned the desired area of the part.

It should be appreciated that while the process of FIG. 2 is shown as a linear or sequential process, in other embodiments one or more of the steps shown may be executed in parallel. In the method shown in FIG. 2, the method involved measuring the entire object first and then carrying out further detailed measurements according to an assessment of the acquired point cloud data. An alternative using the scanner 20 is to begin by measuring detailed or critical regions using the camera 24 having the small FOV.

It should also be appreciated that it is common practice in existing scanning systems to provide a way of changing the camera lens or projector lens as a way of changing the FOV of the camera or of projector in the scanning system. However, such changes are time consuming and typically require an additional compensation step in which an artifact such as a dot plate is placed in front of the camera or projector to determine the aberration correction parameters for the camera or projector system. Hence a scanning system that provides two cameras having different FOVs, such as the cameras 24, 26 of FIG. 1, provides a significant advantage in measurement speed and in enablement of the scanner for a fully automated mode.

Figure 3:
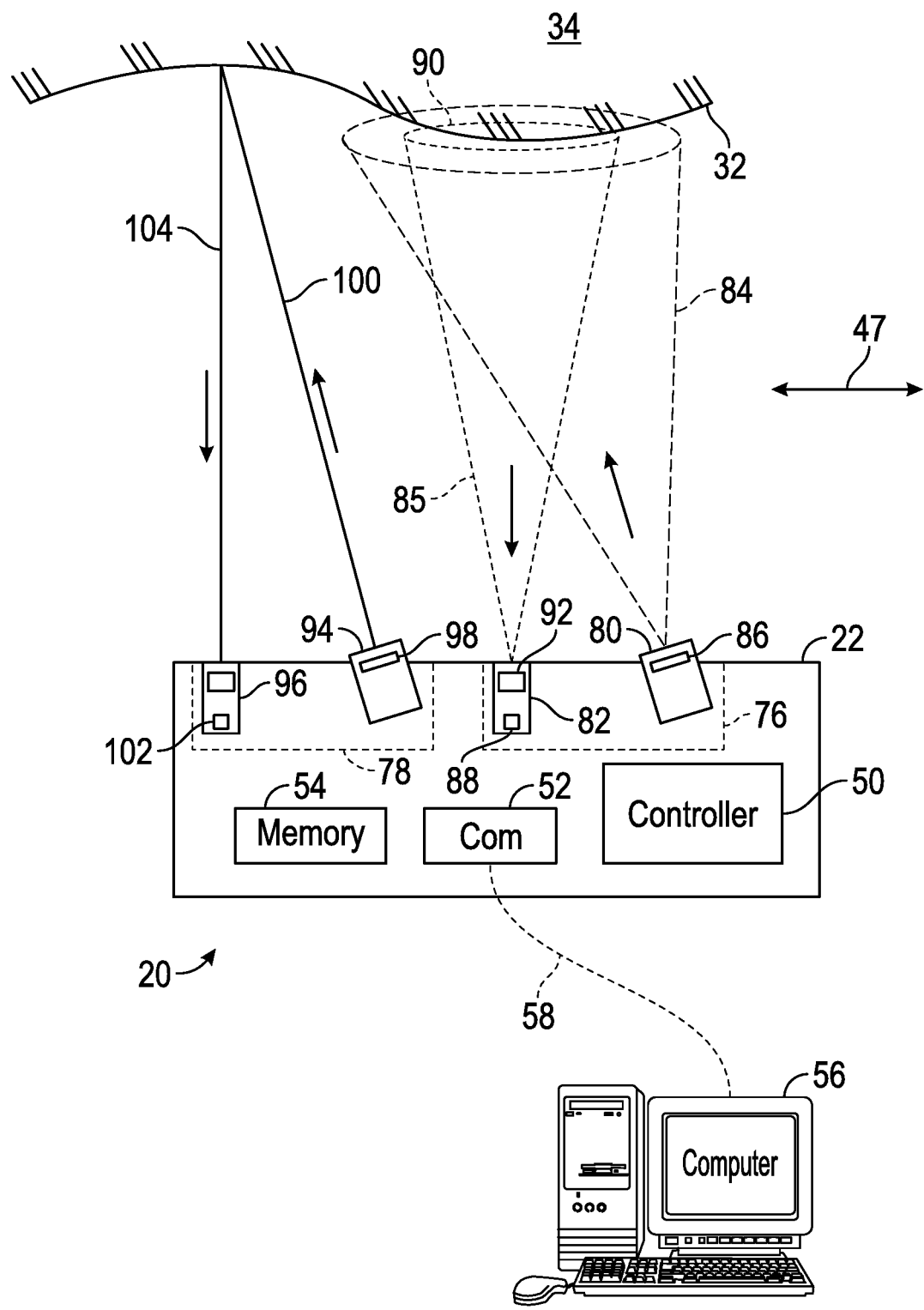
FIG. 3 is a top schematic view of a scanner in accordance with another embodiment of the invention.

Another embodiment is shown in FIG. 3 of a scanner 20 having a housing 22 that includes a first coordinate acquisition system 76 and a second coordinate acquisition system 78. The first coordinate acquisition system 76 includes a first projector 80 and a first camera 82. Similar to the embodiment of FIG. 1, the projector 80 emits light 84 onto a surface 32 of an object 34. In the exemplary embodiment, the projector 80 uses a visible light source that illuminates a pattern generator. The visible light source may be a laser, a superluminescent diode, an incandescent light, a light emitting diode (LED), or other light emitting device. In one embodiment, the pattern generator is a chrome-on-glass slide having a structured light pattern etched thereon. The slide may have a single pattern or multiple patterns that move in and out of position as needed. The slide may be manually or automatically installed in the operating position. In other embodiments, the source pattern may be light reflected off or transmitted by a digital micro-mirror device (DMD) such as a digital light projector (DLP) manufactured by Texas Instruments Corporation, a liquid crystal device (LCD), a liquid crystal on silicon (LCOS) device, or a similar device used in transmission mode rather than reflection mode. The projector 80 may further include a lens system 86 that alters the outgoing light to have the desired focal characteristics.

The first camera 82 includes a photosensitive array sensor 88 which generates a digital image/representation of the area 90 within the sensor's field of view. The sensor may be charged-coupled device (CCD) type sensor or a complementary metal-oxide-semiconductor (CMOS) type sensor for example having an array of pixels. The first camera 82 may further include other components, such as but not limited to lens 92 and other optical devices for example. The first projector 80 and first camera 82 are arranged at an angle in a fixed relationship such that the first camera 82 may detect light 85 from the first projector 80 reflected off of the surface 32 of object 34. It should be appreciated that since the first camera 92 and first projector 80 are arranged in a fixed relationship, the trigonometric principals discussed above may be used to determine coordinates of points on the surface 32 within the area 90. Although for clarity FIG. 3 is depicted as having the first camera 82 near to the first projector 80, it should be appreciated that the camera could be placed nearer the other side of the housing 22. By spacing the first camera 82 and first projector 80 farther apart, accuracy of 3D measurement is expected to improve.

The second coordinate acquisition system 78 includes a second projector 94 and a second camera 96. The projector 94 has a light source that may comprise a laser, a light emitting diode (LED), a superluminescent diode (SLED), a Xenon bulb, or some other suitable type of light source. In an embodiment, a lens 98 is used to focus the light received from the laser light source into a line of light 100 and may comprise one or more cylindrical lenses, or lenses of a variety of other shapes. The lens is also referred to herein as a "lens system" because it may include one or more individual lenses or a collection of lenses. The line of light is substantially straight, i.e., the maximum deviation from a line will be less than about 1% of its length. One type of lens that may be utilized by an embodiment is a rod lens. Rod lenses are typically in the shape of a full cylinder made of glass or plastic polished on the circumference and ground on both ends. Such lenses convert collimated light passing through the diameter of the rod into a line. Another type of lens that may be used is a cylindrical lens. A cylindrical lens is a lens that has the shape of a partial cylinder. For example, one surface of a cylindrical lens may be flat, while the opposing surface is cylindrical in form.

In another embodiment, the projector 94 generates a two-dimensional pattern of light that covers an area of the surface 32. The resulting coordinate acquisition system 78 is then referred to as a structured light scanner.

The second camera 96 includes a sensor 102 such as a charge-coupled device (CCD) type sensor or a complementary metal-oxide-semiconductor (CMOS) type sensor for example. The second camera 96 may further include other components, such as but not limited to lens 104 and other optical devices for example. The second projector 94 and second camera 96 are arranged at an angle such that the second camera 96 may detect light 106 from the second projector 94 reflected off of the object 34. It should be appreciated that since the second projector 94 and the second camera 96 are arranged in a fixed relationship, the trigonometric principles discussed above may be used to determine coordinates of points on the surface 32 on the line formed by light 100. It should also be appreciated that the camera 96 and the projector 94 may be located on opposite sides of the housing 22 to increase 3D measurement accuracy.

In another embodiment, the second coordinate acquisition system is configured to project a variety of patterns, which may include not only a fixed line of light but also a swept line of light, a swept point of light, a coded pattern of light (covering an area), or a sequential pattern of light (covering an area). Each type of projection pattern has different advantages such as speed, accuracy, and immunity to multipath interference. By evaluating the performance requirements for each particular measurements and/or by reviewing the characteristics of the returned data or of the anticipated object shape (from CAD models or from a 3D reconstruction based on collected scan data), it is possible to select the type of projected pattern that optimizes performance.

In another embodiment, the distance from the second coordinate acquisition system 78 and the object surface 32 is different than the distance from the first coordinate acquisition system 76 and the object surface 32. For example, the camera 96 may be positioned closer to the object 32 than the camera 88. In this way, the resolution and accuracy of the second coordinate acquisition system 78 can be improved relative to that of the first coordinate acquisition system 76. In many cases, it is helpful to quickly scan a relatively large and smooth object with a lower resolution system 76 and then scan details including edges and holes with a higher resolution system 78.

A scanner 20 may be used in a manual mode or in an automated mode. In a manual mode, an operator is prompted to move the scanner nearer or farther from the object surface according to the acquisition system that is being used. Furthermore, the scanner 20 may project a beam or pattern of light indicating to the operator the direction in which the scanner is to be moved. Alternatively, indicator lights on the device may indicate the direction in which the scanner should be moved. In an automated mode, the scanner 20 or object 34 may be automatically moved relative to one another according to the measurement requirements.

Similar to the embodiment of FIG. 1, the first coordinate acquisition system 76 and the second coordinate acquisition system 78 are electrically coupled to a controller 50 disposed within the housing 22. The controller 50 may include one or more microprocessors, digital signal processors, memory and signal conditioning circuits. The scanner 20 may further include actuators (not shown) which may be manually activated by the operator to initiate operation and data capture by the scanner 20. In one embodiment, the image processing to determine the X, Y, Z coordinate data of the point cloud representing the surface 32 of object 34 is performed by the controller 50. The coordinate data may be stored locally such as in a volatile or nonvolatile memory 54 for example. The memory may be removable, such as a flash drive or a memory card for example. In other embodiments, the scanner 20 has a communications circuit 52 that allows the scanner 20 to transmit the coordinate data to a remote processing system 56. The communications medium 58 between the scanner 20 and the remote processing system 56 may be wired (e.g. Ethernet) or wireless (e.g. Bluetooth, IEEE 802.11). In one embodiment, the coordinate data is determined by the remote processing system 56 and the scanner 20 transmits acquired images on the communications medium 58.

Figure 4:
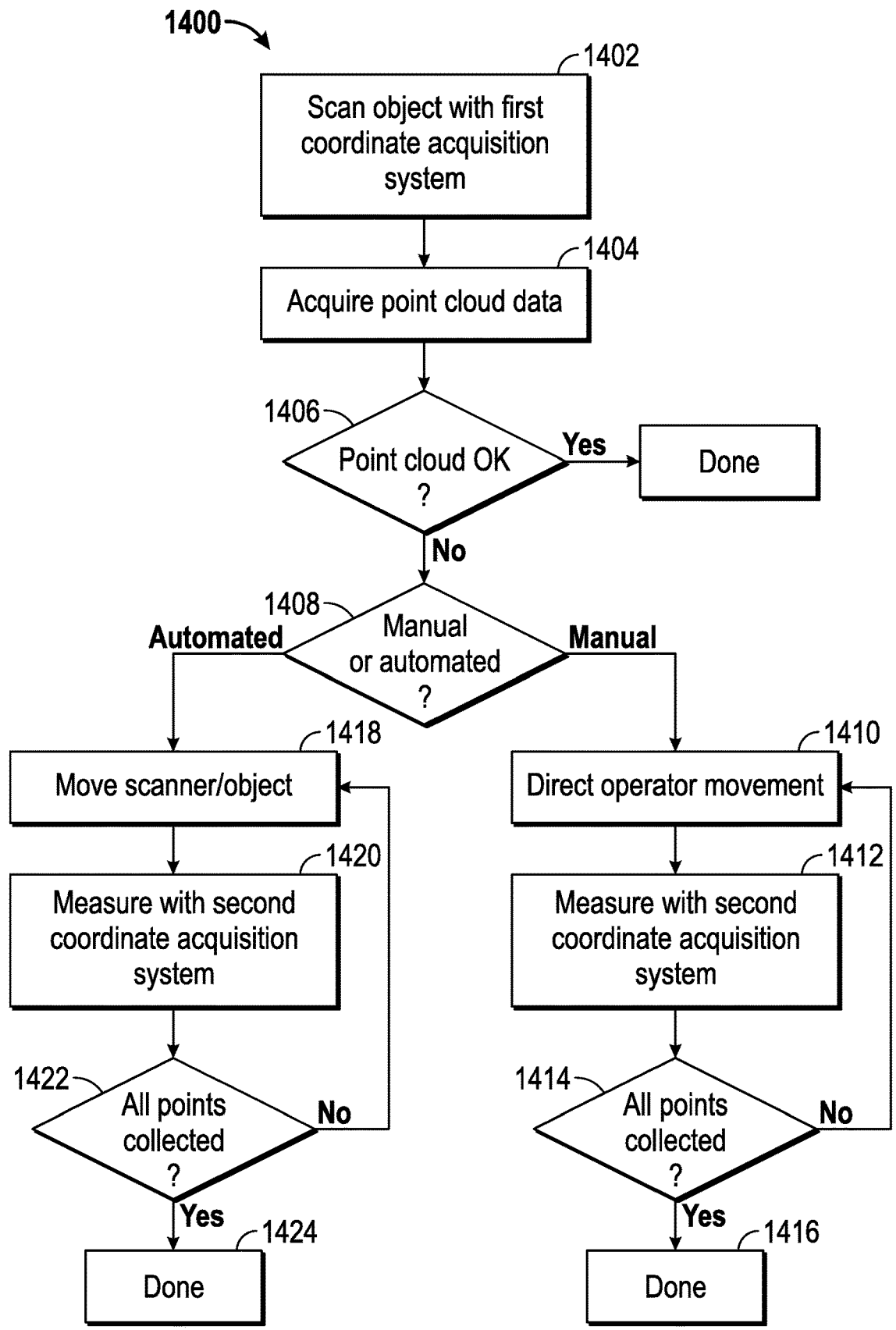
FIG. 4 is a flow chart showing a method of operating the scanner of FIG. 3.

Referring now to FIG. 4, the method 1400 of operating the scanner 20 of FIG. 3 will be described. In block 1402, the first projector 80 of the first coordinate acquisition system 76 of scanner 20 emits a structured light pattern onto the area 90 of surface 32 of the object 34. The light 84 from projector 80 is reflected from the surface 32 and the reflected light 85 is received by the first camera 82. As discussed above, the variations in the surface profile of the surface 32 create distortions in the imaged pattern of light received by the first photosensitive array 88. Since the pattern is formed by structured light, a line or light, or a point of light, it is possible in some instances for the controller 50 or the remote processing system 56 to determine a one to one correspondence between points on the surface 32 and the pixels in the photosensitive array 88. This enables triangulation principles discussed above to be used in block 1404 to obtain point cloud data, which is to say to determine X, Y, Z coordinates of points on the surface 32. By moving the scanner 20 relative to the surface 32, a point cloud may be created of the entire object 34.

In block 1406, the controller 50 or remote processing system 56 determines whether the point cloud data possesses the desired data quality attributes or has a potential problem. The types of problems that may occur were discussed hereinabove in reference to FIG. 2 and this discussion is not repeated here. If the controller determines that the point cloud has the desired data quality attributes in block 1406, the procedure is finished. Otherwise, a determination is made in block 1408 of whether the scanner is used in a manual or automated mode. If the mode is manual, the operator is directed in block 1410 to move the scanner to the desired position.

There are several ways of indicating the desired movement by the operator as described hereinabove with reference to FIG. 2. This discussion is not repeated here.

To direct the operator in obtaining the desired movement, a method of determining the approximate position of the scanner is needed. As explained with reference to FIG. 2, methods may include attachment of the scanner 20 to an articulated arm CMM, use of inertial sensors within the scanner 20, illumination of photogrammetric dots, or matching of features to a displayed image.

After the operator has moved the scanner into position, a measurement is made with the second coordinate acquisition system 78 in block 1412. By using the second coordinate acquisition system, resolution and accuracy may be improved or problems may be eliminated. In block 1414, if all points have been collected, the procedure ends at block 1416; otherwise it continues.

If the mode of operation from block 1408 is automated, then in block 1418 the automated mechanism moves the scanner into the desired position. In most cases, an automated mechanism will have sensors to provide information about the relative position of the scanner and object under test. For the case in which the automated mechanism is a robot, angular transducers within the robot joints provide information about the position and orientation of the robot end effector used to hold the scanner. For other types of automated mechanisms, linear encoders or a variety of other sensors may provide information on the relative position of the object and the scanner.

After the automated mechanism has moved the scanner or object into position, then in block 1420 three-dimensional measurements are made with the second coordinate acquisition system 78. Such measurements are repeated by means of block 1422 until all measurements are completed. The procedure finishes at block 1424.

It should be appreciated that while the process of FIG. 4 is shown as a linear or sequential process, in other embodiments one or more of the steps shown may be executed in parallel. In the method shown in FIG. 4, the method involved measuring the entire object first and then carrying out further detailed measurements according to an assessment of the acquired point cloud data. An alternative using scanner 20 is to begin by measuring detailed or critical regions using the second coordinate acquisition system 78.

It should also be appreciated that it is common practice in existing scanning systems to provide a way of changing the camera lens or projector lens as a way of changing the FOV of the camera or of projector in the scanning system. However, such changes are time consuming and typically require an additional compensation step in which an artifact such as a dot plate is placed in front of the camera or projector to determine the aberration correction parameters for the camera or projector system. Hence a system that provides two different coordinate acquisition systems such as the scanning system 20 of FIG. 3 provides a significant advantage in measurement speed and in enablement of the scanner for a fully automated mode.

An error may occur in making scanner measurements as a result of multipath interference. The origin of multipath interference is now discussed, and a first method for eliminating or reducing multipath interference is described.

The case of multipath interference occurs when the some of the light that strikes the object surface is first scattered off another surface of the object before returning to the camera. For the point on the object that receives this scattered light, the light sent to the photosensitive array then corresponds not only to the light directly projected from the projector but also to the light sent to a different point on the projector and scattered off the object. The result of multipath interference, especially for the case of scanners that project two-dimensional (structured) light, may be to cause the distance calculated from the projector to the object surface at that point to be inaccurate.

Figure 5A:
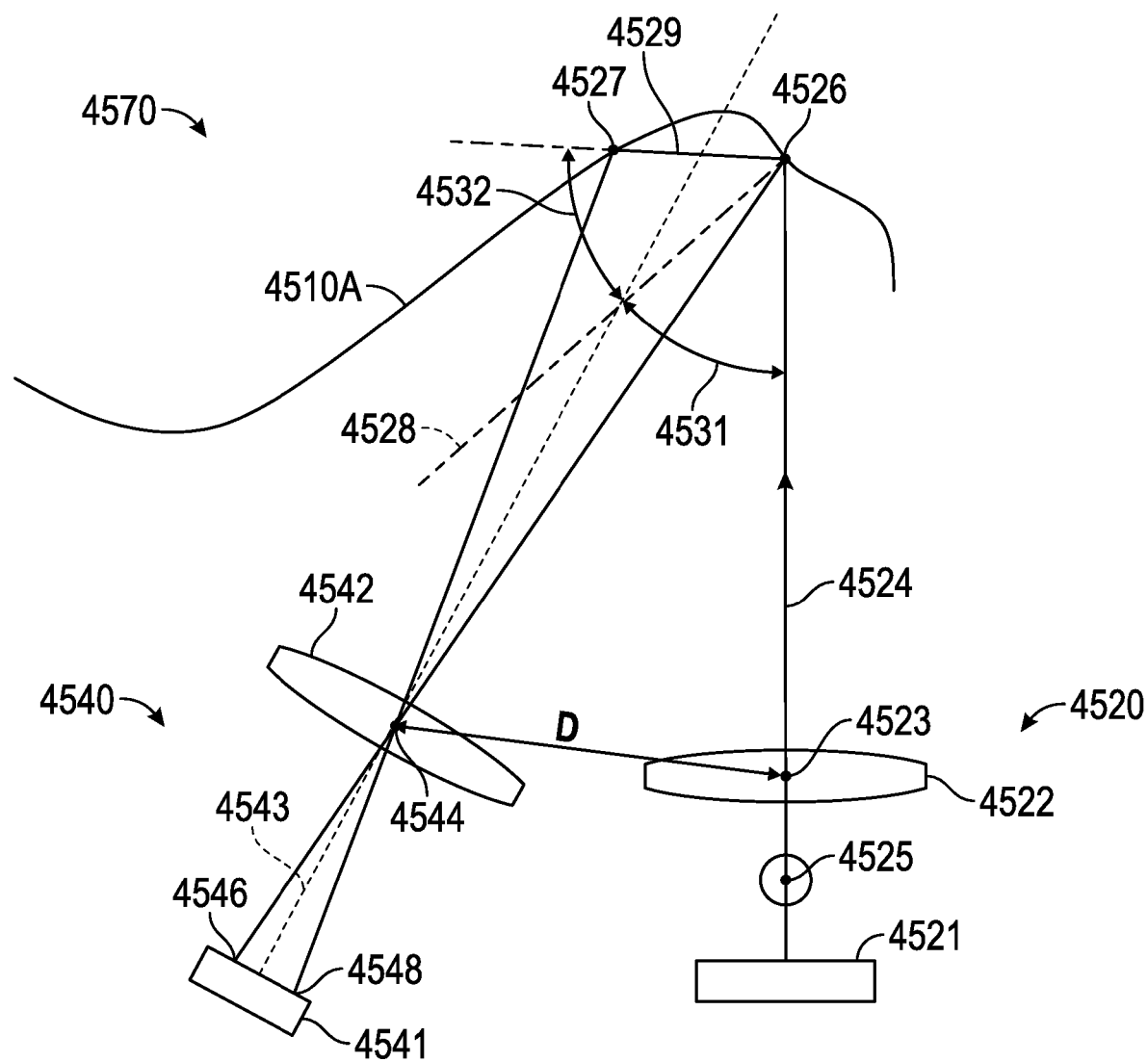
FIG. 5A is a schematic view of elements within a laser scanner according to an embodiment.

An instance of multipath interference is illustrated in reference to FIG. 5A, in this embodiment a scanner 4570 projects a line of light 4525 onto the surface 4510A of an object. The line of light 4525 is perpendicular to the plane of the paper. In an embodiment, the rows of a photosensitive array are parallel to the plane of the paper and the columns are perpendicular to the plane of the paper. Each row represents one point on the projected line 4525 in the direction perpendicular to the plane of the paper. The distance from the projector to the object for that point on the line is found by first calculating the centroid for each row. For the surface point 4526, the centroid on the photosensitive array 4541 is represented by the point 4546. The position 4546 of the centroid on the photosensitive array can be used to calculate the distance from the camera perspective center 4544 to the object point 4526. This calculation is based on trigonometric relationships according to the principles of triangulation. To perform these calculations, the baseline distance D from the camera perspective center 4544 to the projector perspective center 4523 is required. In addition, knowledge of the relative orientation of the projector system 4520 to the camera system 4540 is required.

To understand the error caused by multipath interference, consider the point 4527. Light reflected or scattered from this point is imaged by the lens 4542 onto the point 4548 on the photosensitive array 4541. However, in addition to the light received directly from the projector and scattered off the point 4527, additional light is reflected off the point 4526 onto the point 4527 before being imaged onto the photosensitive array. The light will mostly likely be scattered to an unexpected position and cause two centroids to be formed in a given row. Consequently observation of two centroids on a given row is a good indicator of the presence of multipath interference.

For the case of structured light projected onto an area of the object surface, a secondary reflection from a point such as 4527 is not usually as obvious as for light projected onto a line and hence is more likely to create an error in the measured 3D surface coordinates.

By using a projector having an adjustable pattern of illumination on a display element 4521, it is possible to vary the pattern of illumination. The display element 4521 might be a digital micromechanical mirror (DMM) such as a digital light projector (DLP). Such devices contain multiple small mirrors that are rapidly adjustable by means of an electrical signal to rapidly adjust a pattern of illumination. Other devices that can produce an electrically adjustable display pattern include an LCD (liquid crystal display) and an LCOS (liquid crystal on silicon) display.

A way of checking for multipath interference in a system that projects structured light over an area is to change the display to project a line of light. The presence of multiple centroids in a row will indicate that multipath interference is present. By sweeping the line of light, an area can be covered without requiring that the probe be moved by an operator.

The line of light can be set to any desired angle by an electrically adjustable display. By changing the direction of the projected line of light, multipath interference can, in many cases, be eliminated.

For surfaces having many fold and steep angles so that reflections are hard to avoid, the electrically adjustable display can be used to sweep a point of light. In some cases, a secondary reflection may be produced from a single point of light, but it is usually relatively easy to determine which of the reflected spots of light is valid.

An electrically adjustable display can also be used to quickly switch between a coded and an uncoded pattern. In most cases, a coded pattern is used to make a 3D measurement based on a single frame of camera information. On the other hand, multiple patterns (sequential or uncoded patterns) may be used to obtain greater accuracy in the measured 3D coordinate values.

In the past, electrically adjustable displays have been used to project each of a series of patterns within a sequential pattern—for example, a series of gray scale line patterns followed by a sequence of sinusoidal patterns, each having a different phase.

The present inventive method provides advantages over earlier methods in selecting those methods that identify or eliminate problems such as multipath interference and that indicate whether a single-shot pattern (for example, coded pattern) or a multiple-shot pattern is preferred to obtain the required accuracy as quickly as possible.

For the case of a line scanner, there is often a way to determine the presence of multipath interference. When multipath interference is not present, the light reflected by a point on the object surface is imaged in a single row onto a region of contiguous pixels. If there are two or more regions of a row receive a significant amount of light, multipath interference is indicated. An example of such a multipath interference condition and the resulting extra region of illumination on the photosensitive array are shown in FIG. 5A. The surface 4510A now has a greater curvature near the point of intersection 4526. The surface normal at the point of intersection is the line 4528, and the angle of incidence is 4531. The direction of the reflected line of light 4529 is found from the angle of reflection 4532, which is equal to the angle of incidence. As stated hereinabove, the line of light 4529 actually represents an overall direction for light that scatters over a range of angles. The center of the scattered light strikes the surface 4510A at the point 4527, which is imaged by the lens 4544 at the point 4548 on the photosensitive array. The unexpectedly high amount of light received in the vicinity of point 4548 indicates that multipath interference is probably present. For a line scanner, the main concern with multipath interference is not for the case shown in FIG. 5A, where the two spots 4546 and 4527 are separated by a considerable distance and can be analyzed separately but rather for the case in which the two spots overlap or smear together. In this case, it may not be possible to determine the centroid corresponding to the desired point, which in FIG. 15E corresponds to the point 4546. The problem is made worse for the case of a scanner that projects light over a two-dimensional area as can be understood by again referring to FIG. 5A. If all of the light imaged onto the photosensitive array 4541 were needed to determine two-dimensional coordinates, then it is clear that the light at the point 4527 would correspond to the desired pattern of light directly projected from the projector as well as the unwanted light reflected off the object surface to the point 4527. As a result, in this case, the wrong three dimensional coordinates would likely be calculated for the point 4527 for light projected over an area.

For a projected line of light, in many cases, it is possible to eliminate multipath interference by changing the direction of the line. One possibility is to make a line scanner using a projector having inherent two-dimensional capability, thereby enabling the line to be swept or to be automatically rotated to different directions. An example of such a projector is one that makes use of a digital micromirror (DMD), as discussed hereinabove. For example, if multipath interference were suspected in a particular scan obtained with structured light, a measurement system could be automatically configured to switch to a measurement method using a swept line of light.

Another method to reduce, minimize or eliminate multipath interference is to sweep a point of light, rather than a line of light or an area of light, over those regions for which multipath interference has been indicated. By illuminating a single point of light, any light scattered from a secondary reflection can usually be readily identified.

The determination of the desired pattern projected by an electrical adjustable display benefits from a diagnostic analysis, as described with respect to FIG. 12 below.

Besides its use in diagnosing and correcting multipath interference, changing the pattern of projected light also provides advantages in obtaining a required accuracy and resolution in a minimum amount of time. In an embodiment, a measurement is first performed by projecting a coded pattern of light onto an object in a single shot. The three-dimensional coordinates of the surface are determined using the collected data, and the results analyzed to determine whether some regions have holes, edges, or features that require more detailed analysis. Such detailed analysis might be performed for example by using the narrow FOV camera 24 in FIG. 1 or the high resolution scanner system 78 in FIG. 3.

The coordinates are also analyzed to determine the approximate distance to the target, thereby providing a starting distance for a more accurate measurement method such as a method that sequentially projects sinusoidal phase-shifted patterns of light onto a surface, as discussed hereinabove. Obtaining a starting distance for each point on the surface using the coded light pattern eliminates the need to obtain this information by vary the pitch in multiple sinusoidal phase-shifted scans, thereby saving considerable time.

Figure 5B:
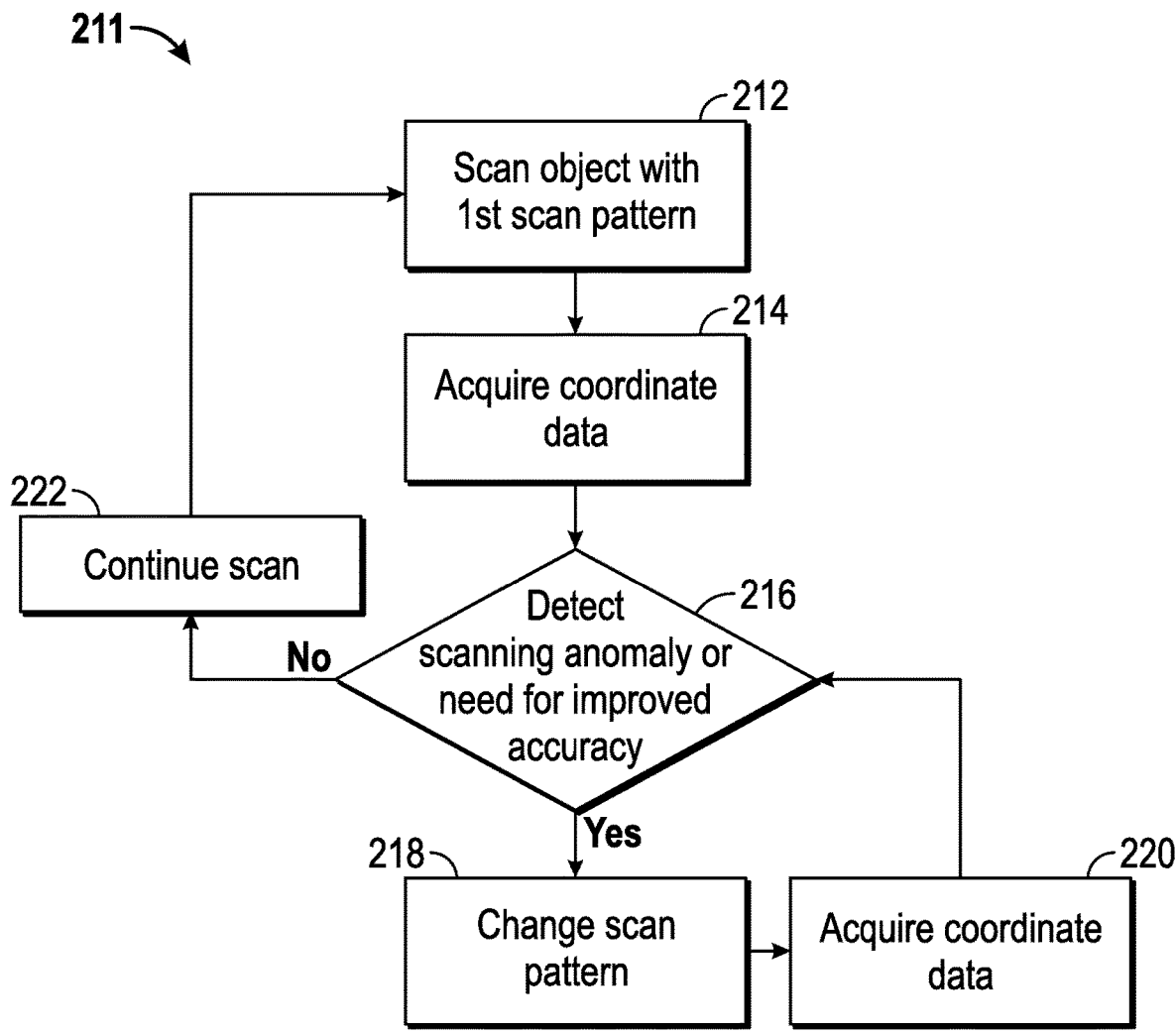
FIG. 5B is a flow chart showing a method of operating a scanner according to an embodiment.

Referring now to FIG. 5B, an embodiment is shown for overcoming anomalies or improving accuracy in coordinate data acquired by scanner 20. The process 211 starts in block 212 by scanning an object, such as object 34, with a scanner 20. The scanner 20 may be a scanner such as those described in the embodiments of FIG. 1, 3, 5 and FIG. 7 for example having at least one projector and a camera. In this embodiment, the scanner 20 projects a first light pattern onto the object in block 212. In one embodiment, this first light pattern is a coded structured light pattern. The process 211 acquires and determines the three-dimensional coordinate data in block 214. The coordinate data is analyzed in query block 216 to determine if there are any anomalies, such as the aforementioned multipath interference, low resolution around an element, or an absence of data due to surface angles or surface reflectance changes. When an anomaly is detected, the process 211 proceeds to block 218 where the light pattern emitted by the projector is changed to a second light pattern. In an embodiment, the second light pattern is a swept line of light.

Figure 11:
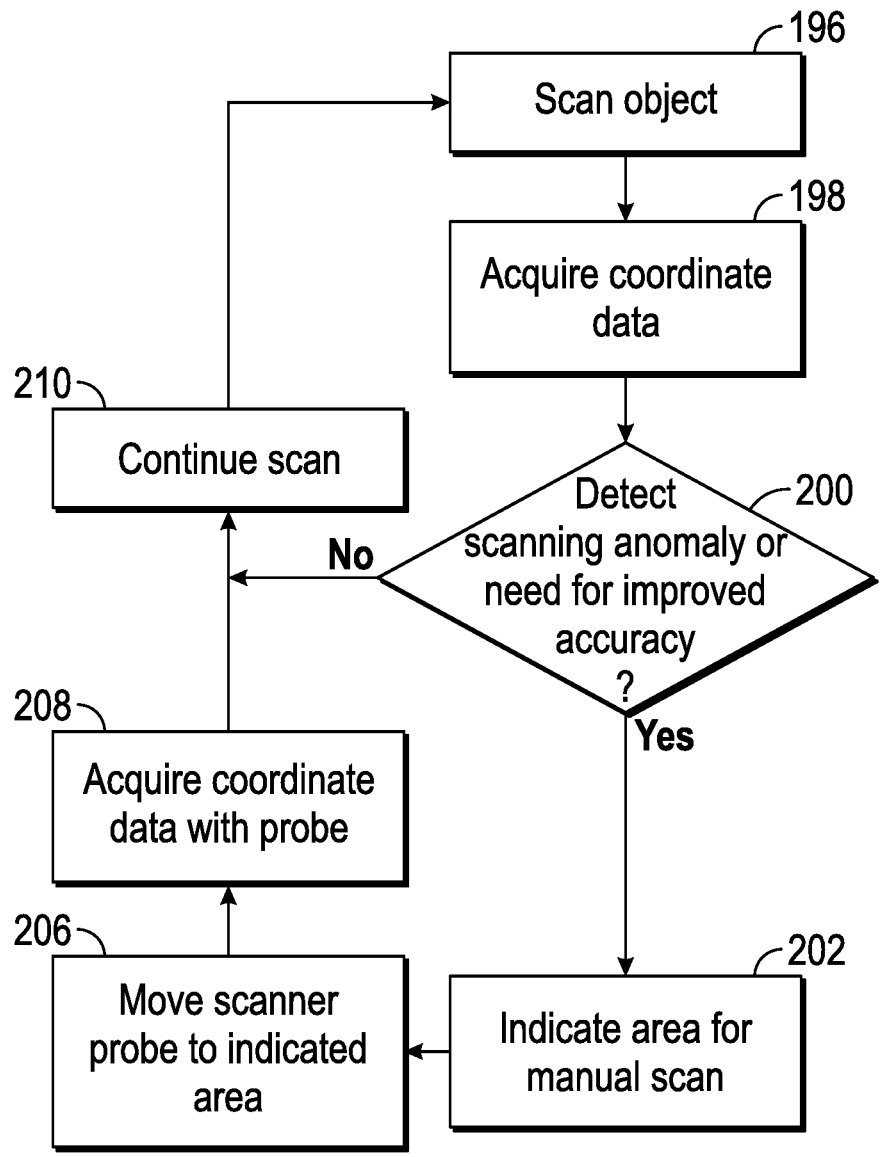
FIG. 11 is a flow chart showing a method of operating the scanner of FIG. 10.

After projecting the second light pattern, the process 211 proceeds to block 220 where the three-dimensional coordinate data is acquired and determined for the area where the anomaly was detected. The process 211 loops back to query block 216 where it is determined if the anomaly has been resolved. If the query block 216 still detects an anomaly or lack or accuracy or resolution, the process loops back to block 218 and switches to a third light pattern. In an embodiment, the third light pattern is a sequential sinusoidal phase shift pattern. In another embodiment, the third light pattern is a swept point of light. This iterative procedure continues until the anomaly has been resolved. Once coordinate data from the area of the anomaly has been determined, the process 211 proceeds to block 222 where the emitted pattern is switched back to the first structured light pattern and the scanning process is continued. The process 211 continues until the operator has scanned the desired area of the object. In the event that the scanning information obtained using the method of FIG. 11 is not satisfactory, a problem of measuring with a tactile probe, as discussed herein, may be used.

Figure 6:
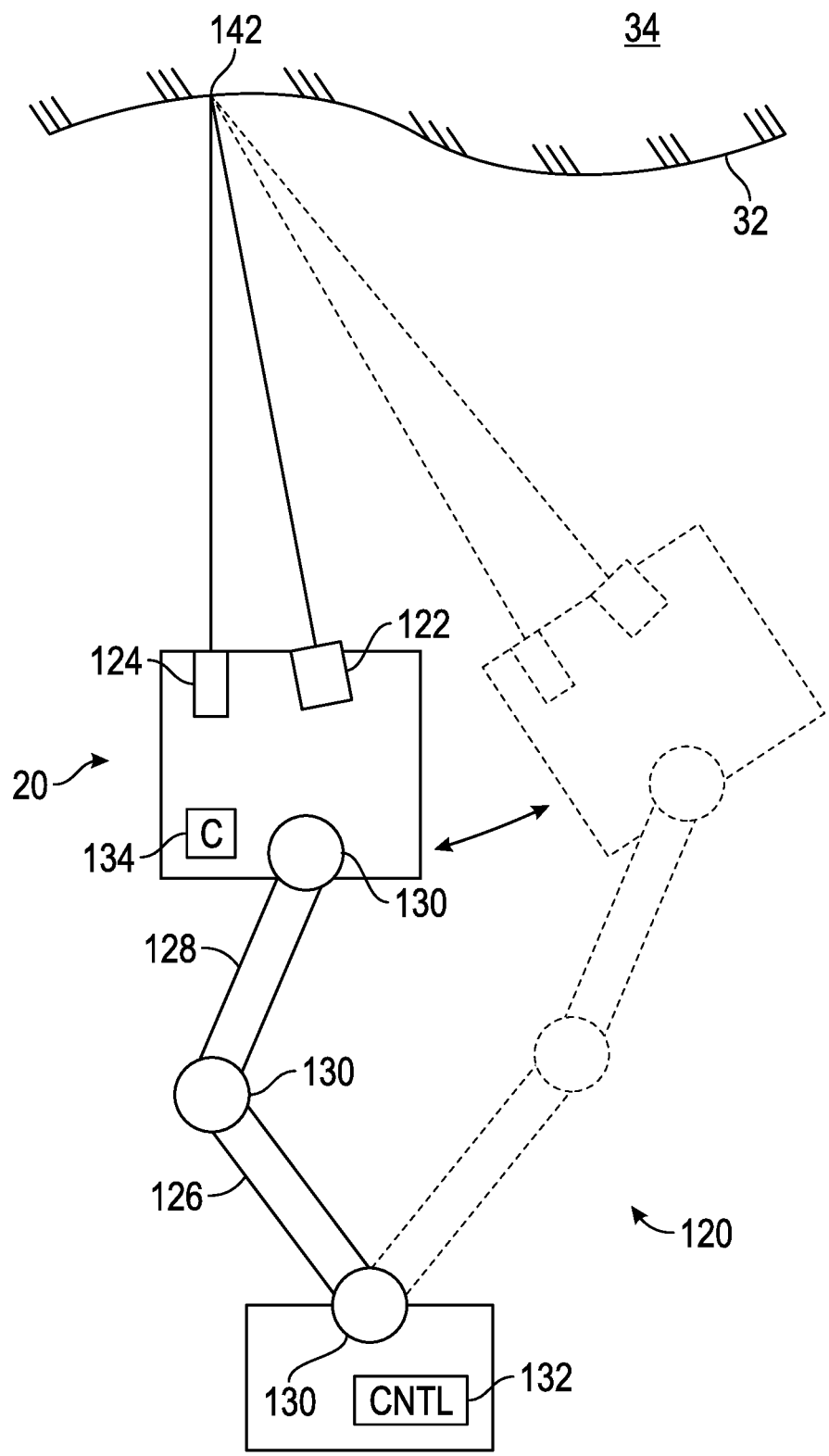
FIG. 6 is a top schematic view of a scanner in accordance with another embodiment of the invention.

Referring now to FIG. 6, another embodiment of a scanner 20 is shown mounted to a movable apparatus 120. The scanner 20 has at least one projector 122 and at least one camera 124 that are arranged in a fixed geometric relationship such that trigonometric principles may be used to determine the three-dimensional coordinates of points on the surface 32. The scanner 20 may be the same scanner as described in reference to FIG. 1 or FIG. 3 for example. In one embodiment, the scanner is the same as the scanner of FIG. 10 having a tactile probe. However the scanner used in the embodiment of FIG. 6 may be any scanner such as a structured light or line scanner, for example, a scanner disclosed in commonly owned U.S. Pat. No. 7,246,030 entitled "Portable Coordinate Measurement Machine with Integrated Line Laser Scanner" filed on 18 Jan. 2006 which is incorporated by reference herein. In another embodiment, the scanner used in the embodiment of FIG. 6 is a structured light scanner that projects light over an area on an object.

In the exemplary embodiment, the moveable apparatus 120 is a robotic apparatus that provides automated movements by means of arm segments 126, 128 that are connected by pivot and swivel joints 130 to allow the arm segments 126, 128 to be moved, resulting in the scanner 20 moving from a first position to a second position (as indicated in dashed line in FIG. 6). The moveable apparatus 120 may include actuators, such as motors (not shown), for example, that are coupled to the arm segments 126, 128 to move the arm segments 126, 128 from the first position to the second position. It should be appreciated that a movable apparatus 120 having articulated arms is for exemplary purposes and the claimed invention should not be so limited. In other embodiments, the scanner 20 may be mounted to a movable apparatus that moves the scanner 20 via rails, wheels, tracks, belts or cables or a combination of the foregoing for example. In other embodiments, the robot has a different number of arm segments.

In one embodiment, the movable apparatus is an articulated arm coordinate measurement machine (AACMM) such as that described in commonly owned U.S. patent application Ser. No. 13/491,176 filed on Jan. 20, 2010. In this embodiment, the movement of the scanner 20 from the first position to the second position may involve the operator manually moving the arm segments 126, 128.

For an embodiment having an automated apparatus, the moveable apparatus 120 further includes a controller 132 that is configured to energize the actuators to move the arm segments 126, 128. In one embodiment, the controller 132 communicates with a controller 134. As will be discussed in more detail below, this arrangement allows the controller 132 to move the scanner 20 in response to an anomaly in the acquired data. It should be appreciated that the controllers 132, 134 may be incorporated into a single processing unit or the functionality may be distributed among several processing units.

Figure 12:
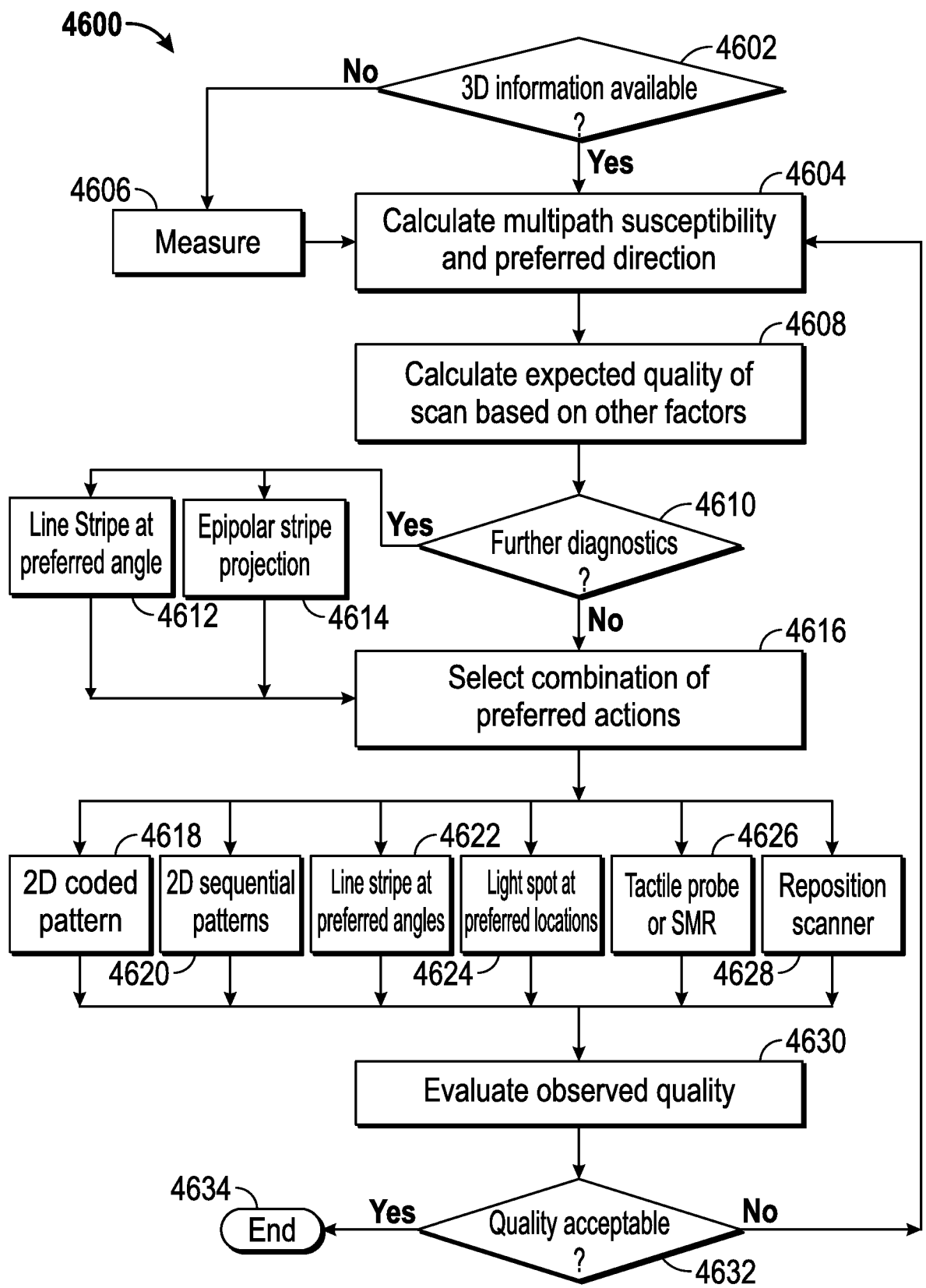
FIG. 12 is a flow chart showing a diagnostic method according to an embodiment.

By carrying out an analysis with reference to FIG. 12, it is possible to position and orient the scanner 20 to obtain the desired measurement results. In some embodiments, a feature being measured may benefit from a desired direction of the scanner. For example, measurement of the diameter of a hole may be improved by orienting the scanner camera 124 to be approximately perpendicular to the hole. In other embodiments, a scanner may be positioned so as to reduce or minimize the possibility of multipath interference. Such an analysis may be based on a CAD model available as a part of the diagnostic procedure or it may be based on data collected by the scanner in an initial position prior to a secondary movement of the scanner 20 by the apparatus 120.

Figure 7:
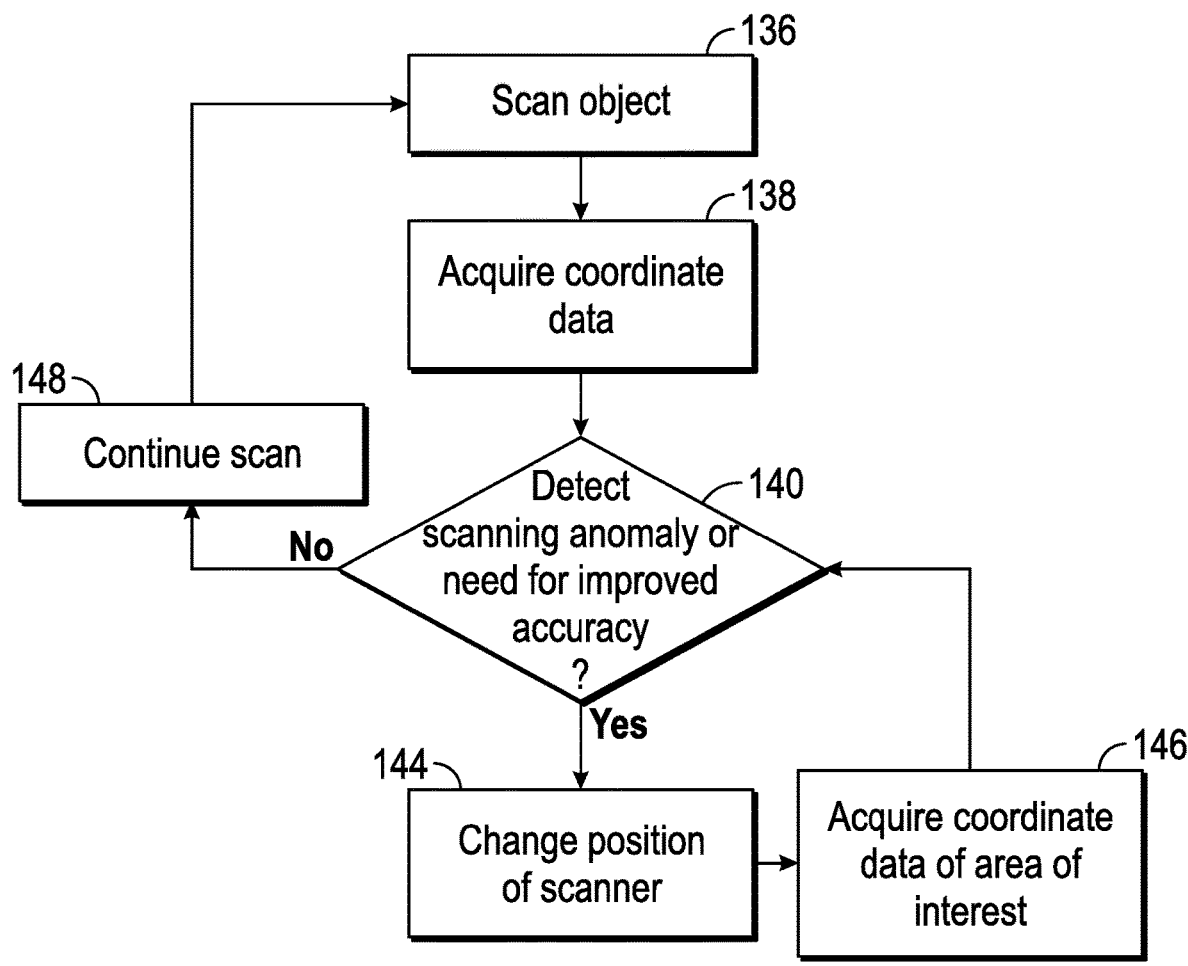
FIG. 7 is a flow chart showing a method of operating the scanner according to an embodiment.

Referring now to FIG. 7, the operation of the scanner 20 and movable apparatus 120 will be described. The process starts in block 136 with scanning the object 34 with the scanner 20 in the first position. The scanner 20 acquires and determines coordinate data for points on the surface 32 of the object 34 in block 138. It should be appreciated that the movable apparatus 120 may move the scanner 20 to acquire data on surface points in a desired area. In query block 140, it is determined whether there is an anomaly in the coordinate data at point 142, such as multipath interference for example, or whether there is a need to change direction to obtain improved resolution or measurement accuracy. It should be appreciated that the point 142 of FIG. 6 may represent a single point, a line of points or an area on the surface 32. If an anomaly or need for improved accuracy is detected, the process continues to block 144 where the movable apparatus 120 moves the position of the scanner 20, such as from the first position to the second position, and rescans the area of interest in block 146 to acquire three-dimensional coordinate data. The process loops back to query block 140 where it is determined whether there is still an anomaly in the coordinate data or if an improvement measurement accuracy is desired. If these cases, the scanner 20 is moved again and the process continues until the measurement results achieve a desired level. Once the coordinate data is obtained, the process proceeds from query block 140 to block 148 where the scanning process continues until the desired area has been scanned.

In embodiments where the scanner 20 includes a tactile probe (FIG. 10), the movement of the scanner from the first position to the second position may be arranged to contact the areas of interest with the tactile probe. Since the position of the scanner, and thus the tactile probe, may be determined from the position and orientation of the arm segments 126, 128 the three-dimensional coordinates of the point on the surface 32 may be determined.

Figure 8A:
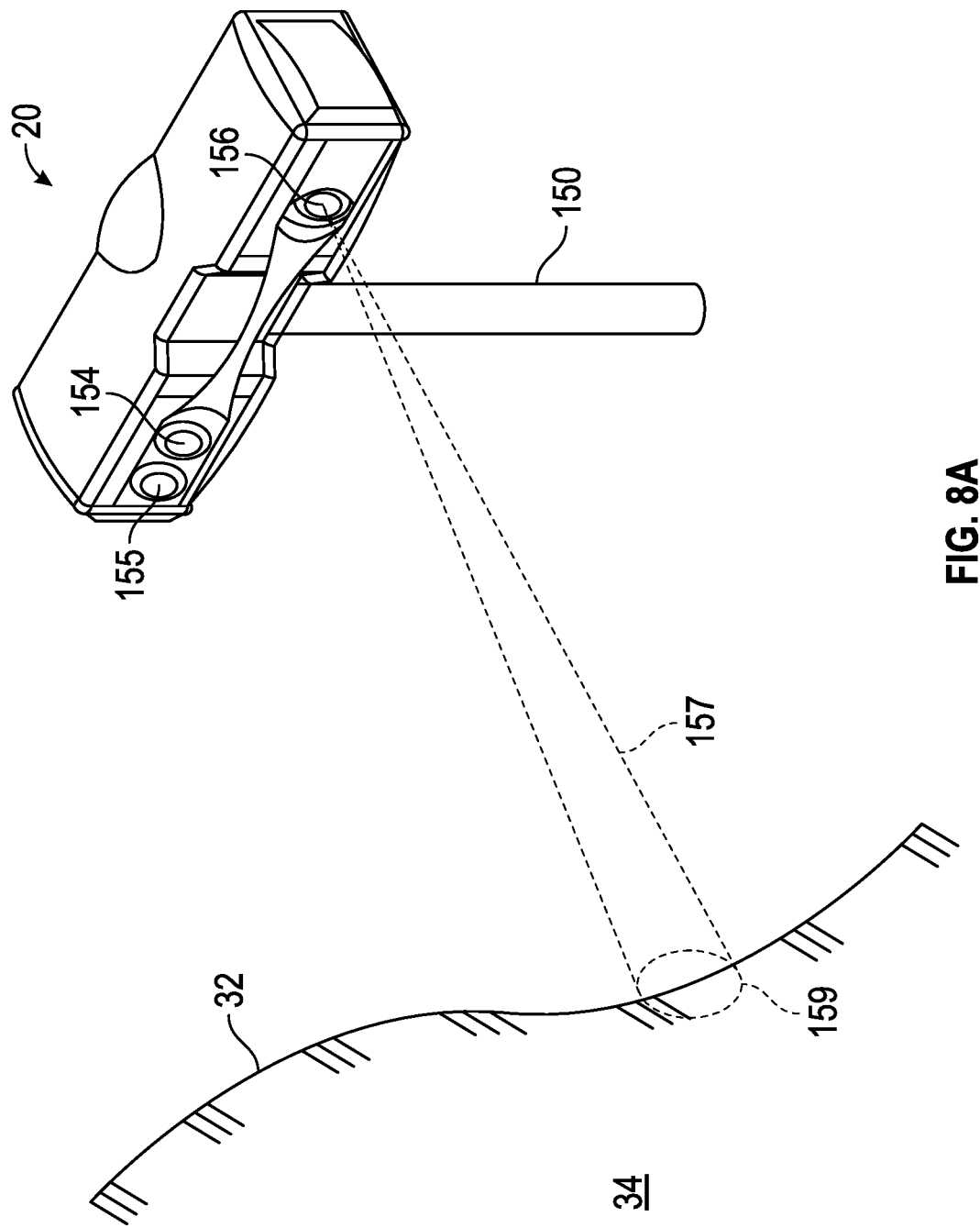
FIGS. 8A and 8B are perspective views of a scanner used in conjunction with a remote probe device in accordance with an embodiment of the invention.
Figure 8B:
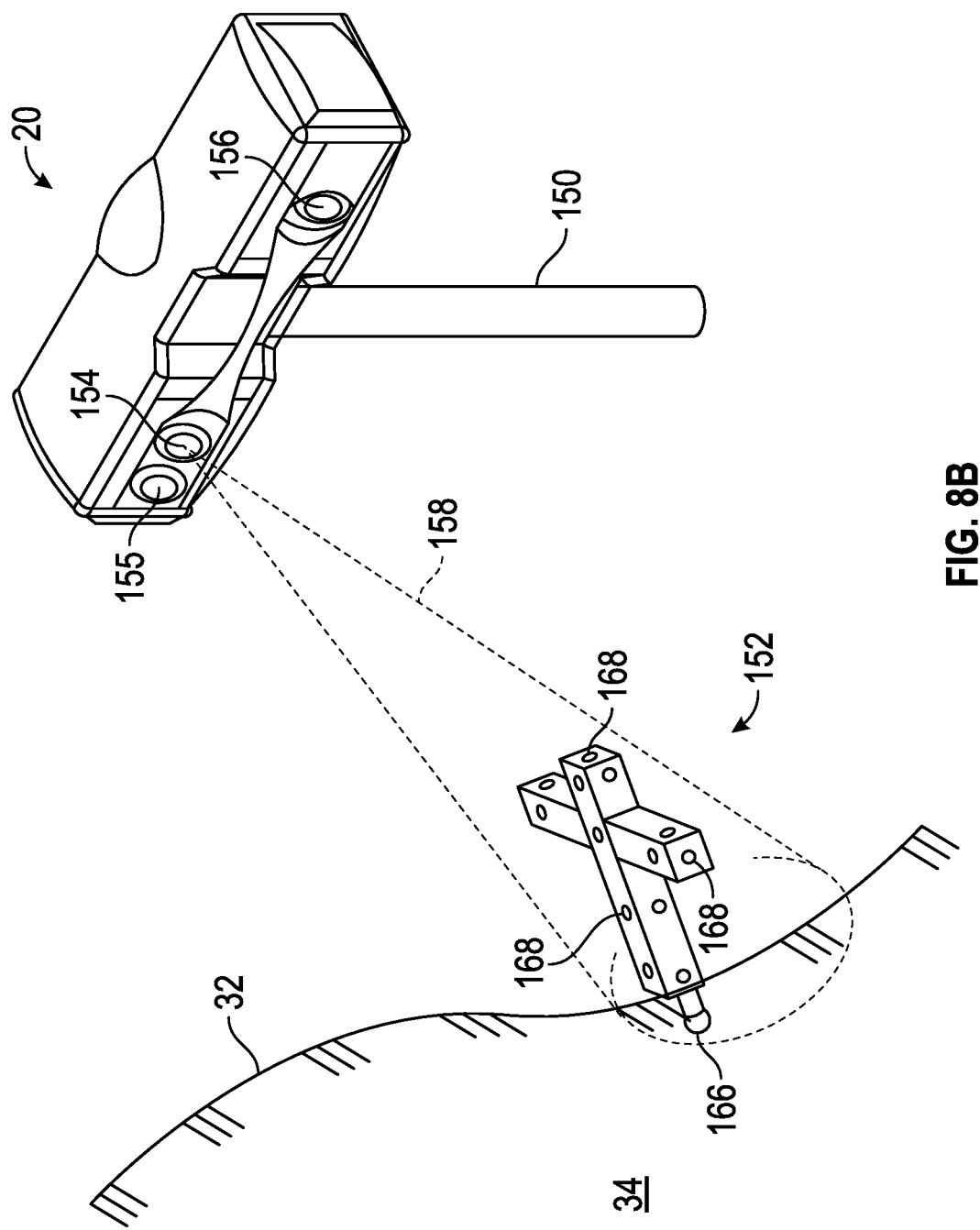

In some embodiments, measurement results obtained by the scanner 20 of FIGS. 8A, 8B may be corrupted by multipath interference. In other cases, measurement results may not provide the desired resolution or accuracy to properly measure some characteristics of the surface 32, especially edges, holes, or intricate features. In these cases, it may be desirable to have an operator use a remote probe 152 to interrogate points or areas on the surface 32. In one embodiment shown in FIGS. 8A, 8B, the scanner 20 includes a projector 156 and cameras 154, 155 arranged on an angle relative to the projector 156 such that light emitted by the projector 156 is reflected off of the surface 32 and received by one or both of the cameras 154, 155. The projector 156 and cameras 154,156 are arranged in a fixed geometric relationship so that trigonometric principles may be used to determine the three-dimensional coordinates of points on the surface 32.

In one embodiment, the projector 156 is configured to emit a visible light 157 onto an area of interest 159 on the surface 32 of object 34 as shown in FIG. 8A. The three-dimensional coordinates of the illuminated area of interest 159 may be confirmed using the image of the illuminated region 159 on one or both of the cameras 154, 155.

The scanner 20 is configured to cooperate with the remote probe 152 so that an operator may bring a probe tip 166 into contact with the object surface 132 at the illuminated region of interest 159. In an embodiment, the remote probe 152 includes at least three non-collinear points of light 168. The points of light 168 may be spots of light produced, for example, by light emitting diodes (LED) or reflective dots of light illuminated by infrared or visible light source from the projector 156 or from another light source not depicted in FIG. 8B. The infrared or visible light source in this case may be attached to the scanner 20 or may be placed external to the scanner 20. By determining the three-dimensional coordinates of the spots of light 168 with the scanner and by using information on the geometry of the probe 152, the position of the probe tip 166 may be determined, thereby enabling the coordinates of the object surface 32 to be determined. A tactile probe used in this way eliminates potential problems from multipath interference and also enables relatively accurate measurement of holes, edges, and detailed features. In an embodiment, the probe 166 is a tactile probe, which may be activated by pressing of an actuator button (not shown) on the probe, or the probe 166 may be a touch-trigger probe activated by contact with the surface 32. In response to a signal produced by the actuator button or the touch trigger probe, a communications circuit (not shown) transmits a signal to the scanner 20. In an embodiment, the points of light 168 are replaced with geometrical patterns of light, which may include lines or curves.

Figure 9:
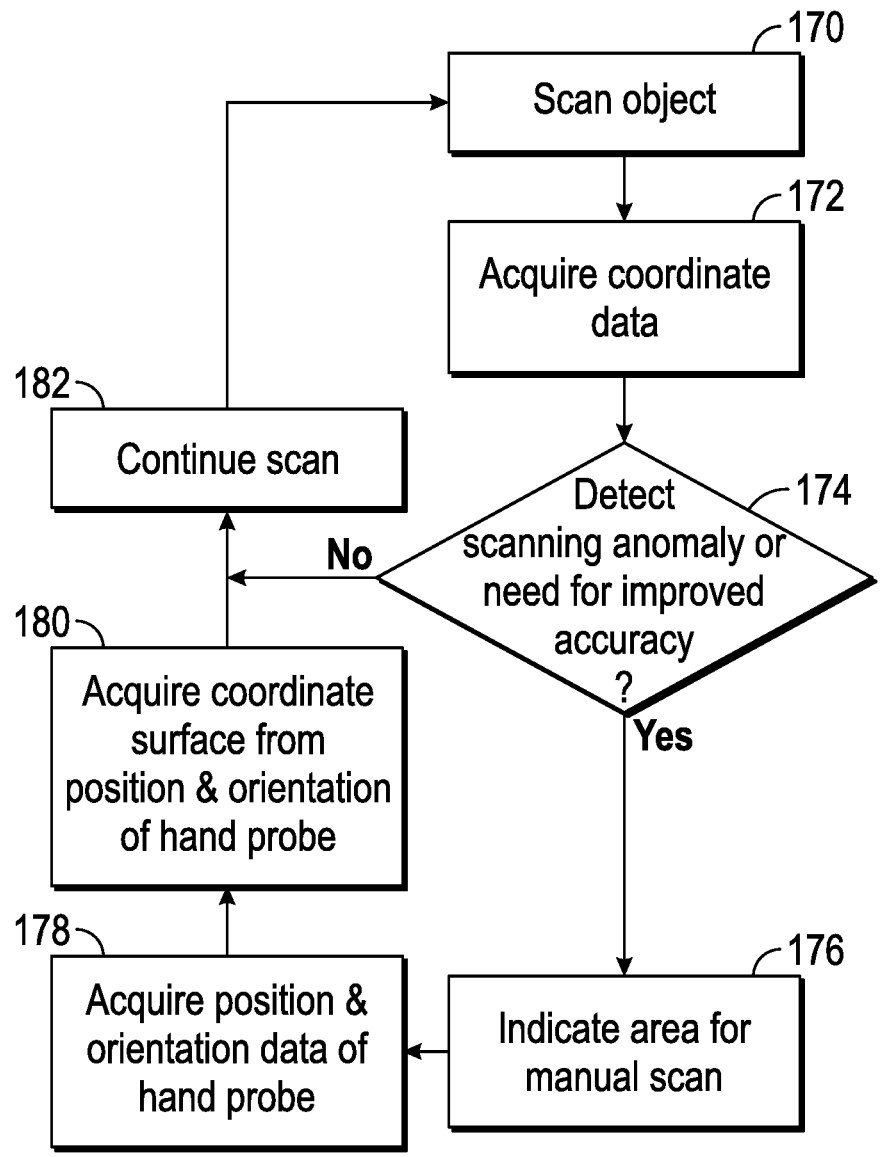
FIG. 9 is a flow chart showing a method of operating the scanner of FIG. 5.

Referring now to FIG. 9, a process is shown for acquiring coordinate data for points on the surface 32 of object 34 using a stationary scanner 20 of FIGS. 8A, 8B with a remote probe 152. The process starts in block 170 with the surface 32 of the object 34 being scanned. The process acquires and determines the three-dimensional coordinate data of the surface 32 in block 172. The process then determines in query block 174 whether there is an anomaly in the coordinate data of area 159 or whether there is a problem in accuracy or resolution of the area 159. An anomaly could be invalid data that is discarded due to multipath interference for example. An anomaly could also be missing data due to surface reflectance or a lack of resolution around a feature such as an opening or hole for example. Details on a diagnostic procedure for detecting (identifying) multipath interference and related problems in given in reference to FIG. 12.

Once the area 159 has been identified, the scanner 20 indicates in block 176 to the operator the coordinate data of area 159 may be acquired via the remote probe 152. This area 159 may be indicated by emitting a visible light 157 to illuminate the area 159. In one embodiment, the light 157 is emitted by the projector 156. The color of light 157 may be changed to inform the operator of the type of anomaly or problem. For example, where multipath interference occurs, the light 157 may be colored red, while a low resolution may be colored green. The area may further be indicated on a display having a graphical representation (e.g. a CAD model) of the object.

The process then proceeds to block 178 to acquire an image of the remote probe 152 when the sensor 166 touches the surface 32. The points of light 168, which may be LEDs or reflective targets, for example, are received by one of the cameras 154, 155. Using best-fit techniques well known to mathematicians, the scanner 20 determines in block 180 the three-dimensional coordinates of the probe center from which three-dimensional coordinates of the object surface 32 are determined in block 180. Once the points in the area 159 where the anomaly was detected have been acquired, the process may proceed to continue the scan of the object 34 in block 182 until the desired areas have been scanned.

Figure 10:
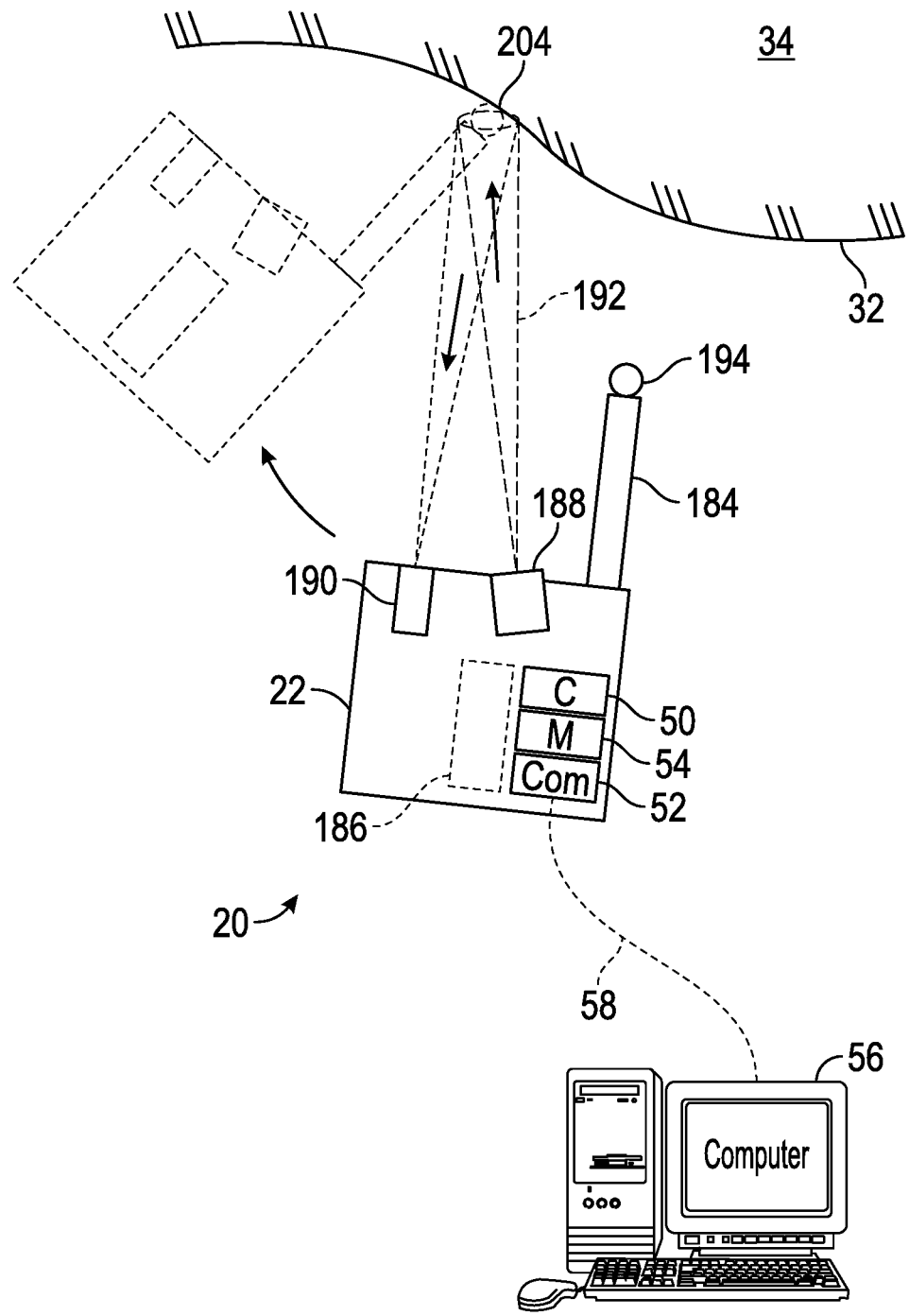
FIG. 10 is top schematic view of a scanner according to an embodiment.

Referring now to FIG. 10, another embodiment of the scanner 20 is shown that may be handheld by the operator during operation. In this embodiment, the housing 22 may include a handle 186 that allows the operator to hold the scanner 20 during operation. The housing 22 includes a projector 188 and a camera 190 arranged on an angle relative to each other such that the light 192 emitted by the projector is reflected off of the surface 32 and received by the camera 190. The scanner 20 of FIG. 10 operates in a manner substantially similar to the embodiments of FIG. 1 and FIG.

3 and acquires three-dimensional coordinate data of points on the surface 32 using trigonometric principles.

The scanner 20 further includes an integral probe member 184. The probe member 184 includes a sensor 194 on one end. The sensor 194 is a tactile probe that may respond to pressing of an actuator button (not shown) by an operator or it may be a touch trigger probe that responds to contact with the surface 32, for example. As will be discussed in more detail below, the probe member 184 allows the operator to acquire coordinates of points on the surface 32 by contacting the sensor 194 to the surface 32.

The projector 188, camera 190 and actuator circuit for the sensor 194 are electrically coupled to a controller 50 disposed within the housing 22. The controller 50 may include one or more microprocessors, digital signal processors, memory and signal conditioning circuits. The scanner 20 may further include actuators (not shown), such as on the handle 186 for example, which may be manually activated by the operator to initiate operation and data capture by the scanner 20. In one embodiment, the image processing to determine the X, Y, Z coordinate data of the point cloud representing the surface 32 of object 34 is performed by the controller 50. The coordinate data may be stored locally such as in a volatile or nonvolatile memory 54 for example. The memory may be removable, such as a flash drive or a memory card for example. In other embodiments, the scanner 20 has a communications circuit 52 that allows the scanner 20 to transmit the coordinate data to a remote processing system 56. The communications medium 58 between the scanner 20 and the remote processing system 56 may be wired (e.g. Ethernet) or wireless (e.g. Bluetooth, IEEE 802.11). In one embodiment, the coordinate data is determined by the remote processing system 56 and the scanner 20 transmits acquired images on the communications medium 58.

Referring now to FIG. 11, the operation of the scanner 20 of FIG. 10 will be described. The process begins in block 196 with the operator scanning the surface 32 of the object 34 by manually moving the scanner 20. The three-dimensional coordinates are determined and acquired in block 198. In query block 200, it is determined if an anomaly is present in the coordinate data or if improved accuracy is needed. As discussed above, anomalies may occur for a number of reasons such as multipath interference, surface reflectance changes or a low resolution of a feature. If an anomaly is present, the process proceeds to block 202 where the area 204 is indicated to the operator. The area 204 may be indicated by projecting a visible light 192 with the projector 188 onto the surface 32. In one embodiment, the light 192 is colored to notify the operator of the type of anomaly detected.

The operator then proceeds to move the scanner from a first position to a second position (indicated by the dashed lines) in block 206. In the second position, the sensor 194 contacts the surface 32. The position and orientation (to six degrees of freedom) of the scanner 20 in the second position may be determined using well known best-fit methods based on images acquired by the camera 190. Since the dimensions and arrangement of the sensor 194 are known in relation to the mechanical structure of the scanner 20, the three-dimensional coordinate data of the points in area 204 may be determined in block 208. The process then proceeds to block 210 where scanning of the object continues. The scanning process continues until the desired area has been scanned.

A general approach may be used to evaluate not only multipath interference but also quality in general, including resolution and effect of material type, surface quality, and geometry. Referring also to FIG. 12, in an embodiment, a method 4600 may be carried out automatically under computer control. A step 4602 is to determine whether information on three-dimensional coordinates of an object under test are available. A first type of three-dimensional information is CAD data. CAD data usually indicates nominal dimensions of an object under test. A second type of three-dimensional information is measured three-dimensional data—for example, data previously measured with a scanner or other device. In some cases, the step 4602 may include a further step of aligning the frame of reference of the coordinate measurement device, for example, laser tracker or six-DOF scanner accessory, with the frame of reference of the object. In an embodiment, this is done by measuring at least three points on the surface of the object with the laser tracker.

If the answer to the question posed in step 4602 is that the three-dimensional information is available, then, in a step 4604, the computer or processor is used to calculate the susceptibility of the object measurement to multipath interference. In an embodiment, this is done by projecting each ray of light emitted by the scanner projector, and calculating the angle or reflection for each case. The computer or software identifies each region of the object surface that is susceptible to error as a result of multipath interference. The step 4604 may also carry out an analysis of the susceptibility to multipath error for a variety of positions of the six-DOF probe relative to the object under test. In some cases, multipath interference may be avoided or minimized by selecting a suitable position and orientation of the six-DOF probe relative to the object under test, as described hereinabove. If the answer to the question posed in step 4602 is that three-dimensional information is not available, then a step 4606 is to measure the three-dimensional coordinates of the object surface using any desired or preferred measurement method. Following the calculation of multipath interference, a step 4608 may be carried out to evaluate other aspects of expected scan quality. One such quality factor is whether the resolution of the scan is sufficient for the features of the object under test. For example, if the resolution of a device is 3 mm, and there are sub-millimeter features for which valid scan data is desired, then these problem regions of the object should be noted for later corrective action. Another quality factor related partly to resolution is the ability to measure edges of the object and edges of holes. Knowledge of scanner performance will enable a determination of whether the scanner resolution is good enough for given edges. Another quality factor is the amount of light expected to be returned from a given feature. Little if any light may be expected to be returned to the scanner from inside a small hole, for example, or from a glancing angle. Also, little light may be expected from certain kinds and colors of materials. Certain types of materials may have a large depth of penetration for the light from the scanner, and in this case good measurement results would not be expected. In some cases, an automatic program may ask for user supplementary information. For example, if a computer program is carrying out steps 4604 and 4608 based on CAD data, it may not know the type of material being used or the surface characteristics of the object under test. In these cases, the step 4608 may include a further step of obtaining material characteristics for the object under test.

Following the analysis of steps 4604 and 4608, the step 4610 is to decide whether further diagnostic procedures should be carried out. A first example of a possible diagnostic procedure is the step 4612 of projecting a stripe at a preferred angle to note whether multipath interference is observed. The general indications of multipath interference for a projected line stripe were discussed hereinabove with reference to FIG. 5. Another example of a diagnostic step is step 4614, which is to project a collection of lines aligned in the direction of epipolar lines on the source pattern of light, for example, the source pattern of light 30 from projector 36 in FIG. 1. For the case in which lines of light in the source pattern of light are aligned to the epipolar lines, then these lines will also appear as straight lines in the image plane on the photosensitive array. The use of epipolar lines is discussed in more detail in commonly owned U.S. patent application Ser. No. 13/443,946 filed Apr. 11, 2012 the contents of which are incorporated by reference herein. If these patterns on the photosensitive array are not straight lines or if the lines are blurred or noisy, then a problem is indicated, possibly as a result of multipath interference.

The step 4616 is to select a combination of preferred actions based on the analyses and diagnostic procedure performed. If speed in a measurement is particularly important, a step 4618 of measuring using a 2D (structured) pattern of coded light may be preferred. If greater accuracy is more important, then a step 4620 of measuring using a 2D (structured) pattern of coded light using sequential patterns, for example, a sequence of sinusoidal patterns of varying phase and pitch, may be preferred. If the method 4618 or 4620 is selected, then it may be desirable to also select a step 4628, which is to reposition the scanner, in other words to adjust the position and orientation of the scanner to the position that minimizes multipath interference and specular reflections (glints) as provided by the analysis of step 4604. Such indications may be provided to a user by illuminating problem regions with light from the scanner projector or by displaying such regions on a monitor display. Alternatively, the next steps in the measurement procedure may be automatically selected by a computer or processor. If the preferred scanner position does not eliminate multipath interference and glints, several options are available. In some cases, the measurement can be repeated with the scanner repositioned and the valid measurement results combined. In other cases, alternative measurement steps may be added to the procedure or performed instead of using structured light. As discussed previously, a step 4622 of scanning a stripe of light provides a convenient way of obtaining information over an area with reduced chance of having a problem from multipath interference. A step 4624 of sweeping a small spot of light over a region of interest further reduces the chance of problems from multipath interference. A step of measuring a region of an object surface with a tactile probe eliminates the possibility of multipath interference. A tactile probe provides a known resolution based on the size of the probe tip, and it eliminates issues with low reflectance of light or large optical penetration depth, which might be found in some objects under test.

In most cases, the quality of the data collected in a combination of the steps 4618-4628 may be evaluated in a step 4630 based on the data obtained from the measurements, combined with the results of the analyses carried out previously. If the quality is found to be acceptable in a step 4632, the measurement is completed at a step 4634. Otherwise, the analysis resumes at the step 4604. In some cases, the 3D information may not have been as accurate as desired. In this case, repeating some of the earlier steps may be helpful.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of determining three-dimensional (3D) coordinates of points on a surface of an object, the method comprising:

providing an assembly that includes a projector and a camera, the projector having a light source configured to emit projected light, the projected light having any of a plurality of patterns, the camera having a lens and a photosensitive array, the camera having a camera field of view;

providing a processor electrically coupled to the projector and the camera;

emitting from the projector onto the surface, in a first instance, a first projected light having a first pattern;

acquiring with the camera a first image of the first projected light and producing a first electrical signal in response;

determining with the processor a first set of 3D coordinates of first points on the surface, the first set based at least in part on the first pattern and the first electrical signal;

determining with the processor a simulation in which, in the first instance, the processor projects first rays from the projector to the first points and calculates for each first ray an angle of reflection of a secondary ray from each of the first points and determining that at least one of the secondary rays intersects the object within the field of view of the camera;

selecting by the processor, in a second instance, a second pattern from among the plurality of patterns, the second pattern being a single line stripe or a single spot, the selection of the second pattern based at least in part on the determining that at least one of the secondary rays intersects the object within the field of view of the camera;

emitting from the projector onto the surface, in the second instance, a second projected light having the second pattern;

acquiring with the camera a second image of the second projected light and producing a second electrical signal in response;

determining with the processor, in the second instance, a second set of 3D coordinates of at least one second point on the surface, the second set based at least in part on the second pattern and the second electrical signal; and storing the second set of 3D coordinates.

2. The method of claim 1 further comprising:

combining the first set of 3D coordinates and the second set of 3D coordinates into a third set of 3D coordinates;

eliminating a portion of the third set of 3D coordinates to obtain a fourth set of 3D coordinates based at least in part on the determining that at least one of the secondary rays intersects the object within the camera field of view; and storing the fourth set of 3D coordinates.

3. The method of claim 1 wherein, in selecting by the processor the second pattern, the second pattern is a first single line stripe having a first stripe direction.

4. The method of claim 3 further comprising moving the first single line stripe to a plurality of positions on the surface and determining 3D coordinates at each of the plurality of positions.

5. The method of claim 4 wherein the first single line stripe maintains a first direction at each of the plurality of positions on the surface.

6. The method of claim 1 wherein, in selecting by the processor the second pattern, the second pattern is the single spot.

7. The method of claim 6 further comprising moving the single spot to a plurality of positions on the surface and determining 3D coordinates at each of the plurality of positions.

8. The method of claim 1 further comprising:
emitting from the projector onto the surface a first projected line of light along an epipolar line of the projector;
acquiring with the camera the first projected line of light on the surface;
determining with the processor that the first projected light acquired by the camera is not a straight line;
determining with the processor a simulation in which, in the first instance, the processor projects first rays from the projector to the first points; and
in the step of selecting of the second pattern, further basing the selecting of the second pattern on the determining that the first projected light acquired by the camera is not a straight line.

9. A method of object measurement to determine three-dimensional (3D) coordinates of points on a surface of an object, the method comprising:
providing an assembly that includes a projector and a camera, the projector having a light source configured to emit projected light, the projected light having any of a plurality of patterns, the camera having a lens and a photosensitive array, the camera having a camera field of view;
providing a processor electrically coupled to the projector and the camera;
providing a CAD model of the object, the CAD model configured to provide computer-readable information for determining a 3D representation of the surface of the object;
providing computer readable media having computer readable instructions which when executed by the processor calculates 3D coordinates of points on the surface based at least in part on the CAD model;
determining with the processor a first set of 3D coordinates of first points on the surface, the first set based at least in part on the computer-readable information in the CAD model;
determining with the processor a simulation in which the processor projects first rays from the projector to the first points and calculates for each first ray an angle of reflection of a secondary ray from each of the first points and determining that at least one of the secondary rays intersects the object within the field of view of the camera;
selecting by the processor a first pattern from among the plurality of patterns, the first pattern being in the first plane, the first pattern being a single line stripe or a single spot, the first pattern based at least in part on the determining that at least one of the secondary rays intersects the object within the field of view of the camera;
emitting from the projector onto the surface a first projected light having the first pattern;
acquiring with the camera a second image of the second projected light and producing a second electrical signal in response;
determining with the processor a second set of 3D coordinates of at least one second point on the surface, the second set based at least in part on the first pattern, the first electrical signal, and the baseline distance; and
storing the second set of 3D coordinates.

10. A system of determining three-dimensional (3D) coordinates of points on a surface of an object, the system comprising:
an assembly that includes a projector and a camera, the projector having a light source configured to emit projected light, the projected light having any of a plurality of patterns, the camera having a lens and a photosensitive array, the camera having a camera field of view; and
one or more processors responsive to executable computer instructions, the one or more processors being electrically coupled to the projector and the camera, the executable computer instructions comprising:
emitting from the projector onto the surface, in a first instance, a first projected light having a first pattern;
acquiring with the camera a first image of the first projected light and producing a first electrical signal in response;
determining a first set of 3D coordinates of first points on the surface, the first set based at least in part on the first pattern and the first electrical signal;
determining a simulation in which, in the first instance, the processor projects first rays from the projector to the first points and calculates for each first ray an angle of reflection of a secondary ray from each of the first points;
determining that at least one of the secondary rays intersects the object within the field of view of the camera;
selecting, in a second instance, a second pattern from among the plurality of patterns, the second pattern being a single line stripe or a single spot, the selection of the second pattern based at least in part on the determining that at least one of the secondary rays intersects the object within the field of view of the camera;
emitting from the projector onto the surface, in the second instance, a second projected light having the second pattern;
acquiring with the camera a second image of the second projected light and producing a second electrical signal in response;
determining, in the second instance, a second set of 3D coordinates of at least one second point on the surface, the second set based at least in part on the second pattern and the second electrical signal; and
storing the second set of 3D coordinates.

11. The system of claim 10, wherein the executable computer instructions further comprise:
combining the first set of 3D coordinates and the second set of 3D coordinates into a third set of 3D coordinates;

eliminating Welet of 3D coordinates based at least in part on the determining that at least one of the secondary rays intersects the object within the camera field of view; and storing the fourth set of 3D coordinates.

12. The system of claim 10, wherein the second pattern is a first single line stripe having a first stripe direction.

13. The system of claim 12, wherein the executable computer instructions further comprise moving the first single line stripe to a plurality of positions on the surface and determining 3D coordinates at each of the plurality of positions.

14. The system of claim 13, wherein the first single line stripe maintains a first direction at each of the plurality of positions on the surface.

15. The system of claim 10, wherein the second pattern is the single spot.

16. The system of claim 15, wherein the executable computer instructions further comprise moving the single spot to a plurality of positions on the surface and determining 3D coordinates at each of the plurality of positions.

17. The system of claim 10, wherein the executable computer instructions further comprise:
- emitting from the projector onto the surface a first projected line of light along an epipolar line of the projector;
- acquiring with the camera the first projected line of light on the surface;
- determining that the first projected light acquired by the camera is not a straight line;
- determining a simulation in which, in the first instance, the processor projects first rays from the projector to the first points; and
- in the step of selecting of the second pattern, the selecting of the second pattern is further based at least in part on the determining that the first projected light acquired by the camera is not a straight line.

18. A system of object measurement to determine three-dimensional (3D) coordinates of points on a surface of an object, the system comprising:
- an assembly that includes a projector and a camera, the projector having a light source operable to emit projected light, the projected light having any of a plurality of patterns, the camera having a lens and a photosensitive array, the camera having a camera field of view;
- one or more processors responsive to executable computer instructions, the one or more processors being electrically coupled to the projector and the camera, the executable computer instructions comprising:
- receiving a CAD model of the object, the CAD model configured to provide computer-readable information for determining a 3D representation of the surface of the object;
- determining 3D coordinates of points on the surface based at least in part on the CAD model;
- determining a first set of 3D coordinates of first points on the surface, the first set based at least in part on the computer-readable information in the CAD model;
- determining a simulation in which the processor projects first rays from the projector to the first points and calculates for each first ray an angle of reflection of a secondary ray from each of the first points;
- determining that at least one of the secondary rays intersects the object within the field of view of the camera;
- selecting a first pattern from among the plurality of patterns, the first pattern being in the first plane, the first pattern being a single line stripe or a single spot, the first pattern based at least in part on the determining that at least one of the secondary rays intersects the object within the field of view of the camera;
- emitting from the projector onto the surface a first projected light having the first pattern;
- acquiring with the camera a second image of the second projected light and producing a second electrical signal in response;
- determining a second set of 3D coordinates of at least one second point on the surface, the second set based at least in part on the first pattern, the first electrical signal, and the baseline distance; and
- storing the second set of 3D coordinates.

* * * * *